United States Patent
Kim et al.

(10) Patent No.: US 11,087,516 B2
(45) Date of Patent: Aug. 10, 2021

(54) ELECTRONIC DEVICE AND METHOD FOR CORRECTING HANDWRITING BY SAME

(71) Applicant: Samsung Electronics Co., Ltd., Gyeonggi-do (KR)

(72) Inventors: Dohyeon Kim, Gyeonggi-do (KR); Dongki Kim, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 8 days.

(21) Appl. No.: 16/774,081

(22) Filed: Jan. 28, 2020

(65) Prior Publication Data

US 2020/0242825 A1 Jul. 30, 2020

(30) Foreign Application Priority Data

Jan. 28, 2019 (KR) ........................ 10-2019-0010492

(51) Int. Cl.
*G06T 11/00* (2006.01)
*G06T 11/60* (2006.01)
(Continued)

(52) U.S. Cl.
CPC .......... *G06T 11/60* (2013.01); *G06K 9/00402* (2013.01); *G06K 9/4642* (2013.01);
(Continued)

(58) Field of Classification Search
CPC .. G06T 11/60; G06K 9/00402; G06K 9/4642; G06K 2209/01; G06K 2209/013; G06N 3/08
See application file for complete search history.

(56) References Cited

U.S. PATENT DOCUMENTS

| 7,646,913 B2 | 1/2010 | Abdulkader et al. |
| 2006/0193518 A1* | 8/2006 | Dong .................. G06K 9/3283 382/186 |

(Continued)

FOREIGN PATENT DOCUMENTS

| CN | 102831418 A | 12/2012 |
| JP | 07306915 A * | 11/1995 ............... G06K 9/32 |

(Continued)

OTHER PUBLICATIONS

Marti, Writer Identification Using Text Line Based Features, IEEE Xplore, pp. 101-105, Aug. 7 (Year: 2002).*

(Continued)

*Primary Examiner* — Ping Y Hsieh
*Assistant Examiner* — Xiao Liu
(74) *Attorney, Agent, or Firm* — Cha & Reiter, LLC.

(57) ABSTRACT

An electronic device and method are disclosed herein. The electronic device includes: a processor, and a memory operatively connected to the processor. The processor implements the method, including: receive an input of handwritten text including characters, set corpus line key points indicating a substantial-top positions of the characters included in the handwritten text and base line key points indicating a substantial bottom positions of the characters, calculate at least a first feature value based on at least one corpus line key point from among the corpus line key points, and a second feature value based on at least one extracted base line key point from among the base line key points, respectively, input the calculated first feature value into a first neural network to cause the first neural network to generate a first result value, input the calculated second feature value into a second neural network to cause the second neural network to generate a second result value, and input the first result value and the second result value into a (Continued)

fully connected neural network to generate a third result value.

20 Claims, 34 Drawing Sheets

(51) Int. Cl.
    *G06K 9/00*         (2006.01)
    *G06N 3/08*         (2006.01)
    *G06K 9/46*         (2006.01)

(52) U.S. Cl.
    CPC ........... *G06N 3/08* (2013.01); *G06K 2209/01* (2013.01); *G06K 2209/013* (2013.01)

(56) References Cited

U.S. PATENT DOCUMENTS

| | | |
|---|---|---|
| 2016/0154997 A1 | 6/2016 | Kim et al. |
| 2018/0032494 A1* | 2/2018 | Charles .............. G06K 9/00416 |
| 2018/0189558 A1 | 7/2018 | Shushtorovich et al. |
| 2018/0293435 A1 | 10/2018 | Wang |

FOREIGN PATENT DOCUMENTS

| | | | |
|---|---|---|---|
| JP | 2007-316754 A | 12/2007 | |
| KR | 10-2018-0019625 A | 3/2008 | |
| WO | WO-2018090013 A1 * | 5/2018 | ........... G06K 9/4628 |

OTHER PUBLICATIONS

Gouranga Mandal; An Unprecedented Approach of Skew Detection and Correction for Online Bengali Handwritten Words; (IJARCET) vol. 7, Issue 2, Feb. 2018; pp. 155-159.

Husam Ahmed, Al Hamad; Skew Detection/Correction and Local Minima/Maxima Techniques for Extracting a New Arabic Benchmark Database; Department of Information Technology Qassim Univ. Qassim, Saudi Arabia; www.ijacsa.thesai.org; (IJACSA) vol. 6, No. 3, 2015; 10 pages.

Vaishali N. Katkar, Nilesh S. Sahare; Skew Detection and Correction in Handwritten Hindi Document; 4 pages.

Tian Jipeng, G.Hemantha Kumar, H.K. Chethan; Skew correction for Chinese character using Hough transform; (IJACSA) Special Issue on Image Processing and Analysis; www.ijacsa.thesai.org; p. 45-48.

L.B. Mahanta, Alpana Deka; "Shew and Slant Angles of Handwritten Signature"; (IJIRCCE) vol. 1, Issue 9, Nov. 2013; www.ijircce.com; pp. 2030-2034.

Rudra N. Hota et al. "A Simple and Efficient Lane Detection using Clustering and Weighted Regression"; SET Labs, Infosys Technologies Ltd.; [rudranarayan_hota, shahanaz_syed, subhadip_b and radhakrishna_p]@infosys.com; 8 pages.

Harsheel Kaur; "Slant Correction and Resampling for Online Handwritten Characters Recognition of Gurmukhi Script"; Roll No. 300903005 Under the guidance of Dr. Rajesh Kumar; School of Mathematics and Computer Application, Jul. 2011; 55 pages.

International Search Report dated Mar. 19, 2020.

* cited by examiner

ELECTRONIC DEVICE AND METHOD FOR CORRECTING HANDWRITING BY SAME

CROSS-REFERENCE TO RELATED APPLICATION(S)

This application is based on and claims priority under 35 U.S.C. 119 to Korean Patent Application No. 10-2019-0010492, filed on Jan. 28, 2019, in the Korean Intellectual Property Office, the disclosure of which is herein incorporated by reference in its entirety.

BACKGROUND

1) Field

Certain embodiments of the disclosure relate to an electronic device and a method for correcting handwriting by the same.

2) Description of Related Art

Recently, various electronic devices (e.g., mobile terminals, smart phones, tablet PCs) have been implemented to include a touch screen. This enables users to generate handwriting input using, for example, a stylus pen or a finger.

User handwriting inputs typically indicate a plurality of characters including texts, markings, and/or numbers according to various input languages. Unlike printed fonts, no standards have yet been established with respect to size, height, width, spacing, or position of handwritten characters, due to the variability of written handwriting, which is unique to each user.

The above information is presented as background information only to assist with an understanding of the disclosure. No determination has been made, and no assertion is made, as to whether any of the above might be applicable as prior art with regard to the disclosure.

SUMMARY

Handwritten inputs have not been digitally standardized due to the variability of user handwriting combined with the diversity of style in drawing characters, symbols, and numbers in multiple languages. Accordingly, to enable a more aesthetically pleasing visual presentation of the handwriting, visual corrections may be applied the user's handwritten input in order to format and standardize the input stylistically.

Certain embodiments of the disclosure may provide an electronic device and method for applying digital formatting and algorithmic corrections to manually input handwriting.

An electronic device according to certain embodiments of the disclosure may include: a processor, and a memory operatively connected to the processor, wherein the memory stores instructions that are executable to cause the processor to: receive an input of handwritten text including characters, set corpus line key points indicating a substantial-top positions of the characters included in the handwritten text and base line key points indicating a substantial bottom positions of the characters, calculate at least a first feature value based on at least one corpus line key point from among the corpus line key points, and a second feature value based on at least one extracted base line key point from among the base line key points, respectively, input the calculated first feature value into a first neural network to cause the first neural network to generate a first result value, input the calculated second feature value into a second neural network to cause the second neural network to generate a second result value, and input the first result value and the second result value into a fully connected neural network to generate a third result value.

A method of an electronic device according to certain embodiments of the disclosure may include: receiving, using input circuitry, an input of handwritten text including characters, setting, using a processor, corpus line key points indicating substantial-top positions of the characters included in the handwritten text, and setting base line key points indicating substantial bottom positions of the characters included in the handwritten text, calculating, using the processor, at least a first feature value based on at least one corpus line key point from among the corpus line key points, and a second feature value based on at least one extracted base line key point from among the base line key points, respectively, inputting, using the processor, the calculated first feature value into a first neural network to cause the first neural network to generate a first result value, inputting, using the processor, the calculated second feature value into a second neural network to cause the second neural network to generate a second result value, and inputting, using the processor, the first result value and the second result value into a fully connected neural network to generate a third result value.

An electronic device according to certain embodiments of the disclosure may include: a display, a communication circuit, a processor operatively connected to the display and the communication circuit, and a memory operatively connected to the processor, wherein the memory stores instructions that are executable by the processor to cause the electronic device to: receive an input of handwritten text including characters, set corpus line key points indicating a substantial-top positions of the characters included in the handwritten text and base line key points indicating a substantial bottom positions of the characters, calculate at least a first feature value based on at least one corpus line key point from among the corpus line key points, and a second feature value based on at least one extracted base line key point from among the base line key points, respectively, transmit the at least one first feature value and the at least one second feature value to a server through the communication circuit, and receive, from the server, a third result value generated by processing of the at least one first feature value and the at least one second feature value by a fully connected neural network.

Certain embodiments of the disclosure can analyze user's handwriting and correct a slope of the handwriting to increase the aesthetic impression of the handwriting.

Certain embodiments of the disclosure can analyze user's handwriting and perform slope correction to achieve a more natural and balanced optimal handwriting through a neural network based on learning.

Certain embodiments of the disclosure can provide a handwriting slope correction method which is widely applicable to unstandardized handwriting which includes characters, numbers, or symbols according to various languages.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
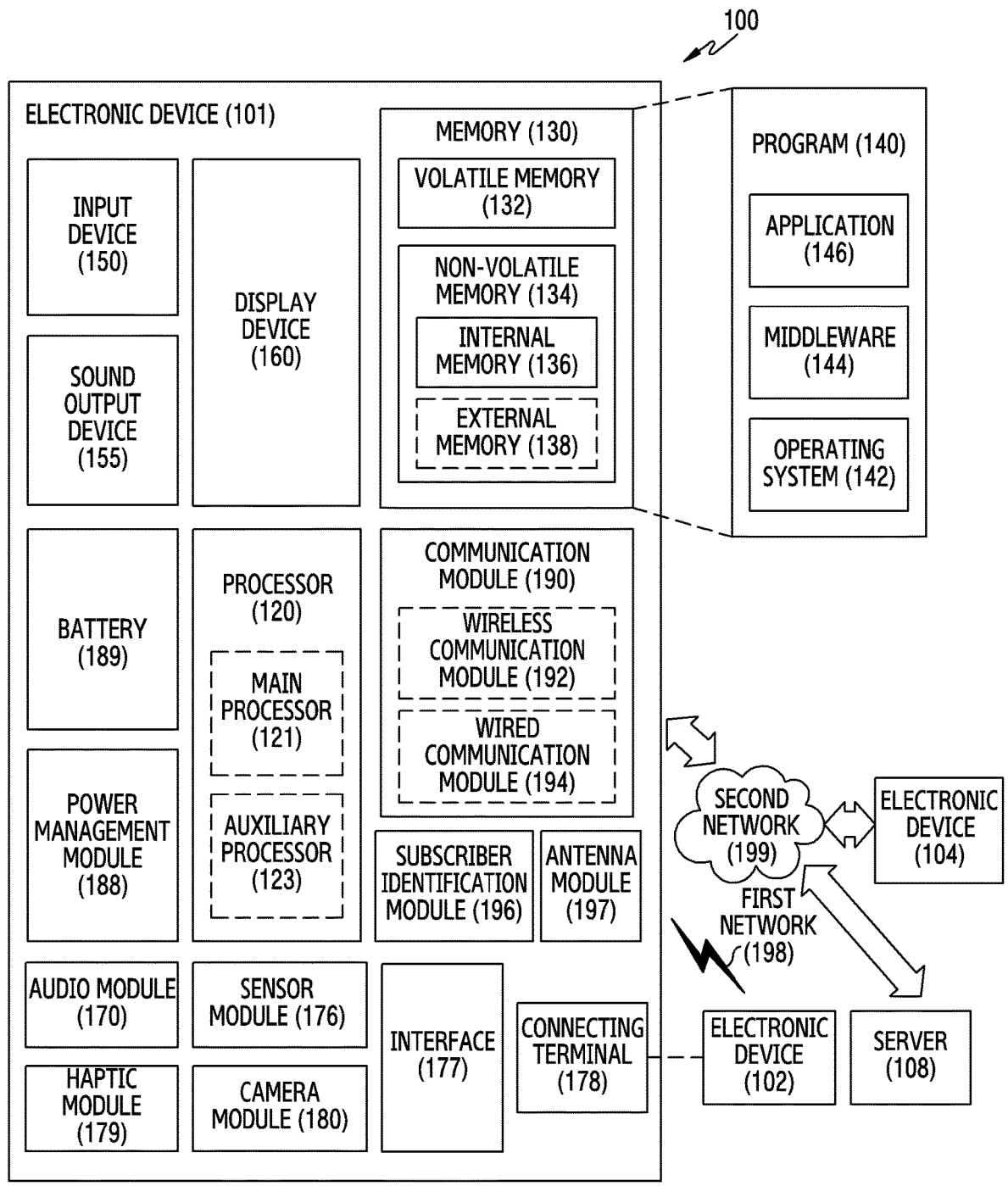
FIG. 1 is a block diagram of an electronic device in a network environment according to certain embodiments.

Hereinafter, certain embodiments of the disclosure will be described with reference to the accompanying drawings. The disclosure includes specific embodiments illustrated in the drawings and relevant descriptions described in detail. However, this disclosure is not intended to limit the certain embodiments to specific forms. For example, it will be apparent to those skilled in the art that embodiments of the disclosure may be variously changed.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

An electronic device (e.g., the electronic device 101 in FIG. 1) according to certain embodiments may include a processor (e.g., the processor 120 in FIG. 1) and a memory operatively connected to the processor 120 (e.g., the memory 130 in FIG. 1). The memory 130 may store instructions that, when executed, cause the processor 120 to: extract corpus line key points and base line key points for from least one character constituting received handwriting; calculate at least one first feature value based on the at least one extracted corpus line key point and at least one second feature value based on the at least one extracted base line key point, respectively; input the at least one calculated first feature value into a first neural network to generate a first result value; input the at least one calculated second feature value into a second neural network to generate a second result value; and input the first result value and the second result value into a fully connected neural network to generate a third result value.

According to certain embodiments, the instructions may cause the processor 120 to calculate the first feature value by using a slope value between one key point of the corpus line key points and one or more other key points, and calculate the second feature value by using a slope value between one key point of the base line key points and one or more other key points.

According to certain embodiments, the instructions may cause the processor 120 to generate the first result value by inputting the at least one calculated first feature value into the first neural network including at least one neural network and generate the second result value by inputting the at least one calculated second feature value into the second neural network including at least one neural network.

According to certain embodiments, the instructions may cause the processor 120 to generate the third result value by inputting the first result value and the second result value into the fully connected neural network including at least one neural network.

According to certain embodiments, the instructions may cause the processor 120 to sequentially input the at least one calculated first feature value into the first neural network according to the order in which the corresponding characters are generated and sequentially input the at least one calculated second feature value into the second neural network according to the order in which the corresponding characters are generated.

According to certain embodiments, the instructions may cause the processor 120 to: recognize the at least one character constituting the received handwriting to identify a character code; set an initial reference point, based on an area of the at least one character; select an effective area within the character, based on the initial reference point; and determine a position of a corpus line and a base line for the at least one character and extract a corpus line key point and a base line key point, based on the effective area within the character and the recognized character code of the at least one character.

According to certain embodiments, the instructions may cause the processor 120 to divide the effective area within the character into two or more areas by using a plurality of horizontal lines, based on the character code, and determine positions of the corpus line and the base line and extract the corpus line key point and the base line key point, based on the character arranged in the two or more divided areas.

According to certain embodiments, the instructions may cause the processor 120 to determine reliability of the at least one character, based on the effective area within the character, and exclude a character having the reliability equal to or less than a threshold, based on a result of the determination.

The electronic device 101 according to certain embodiments may further include a touch screen display (e.g., the display device 160 in FIG. 1) that is operatively connected to the processor 120. The instructions may cause the processor 120 to receive an input of the handwriting through the display and correct the handwriting according to the third result value to output the corrected handwriting on the display 160.

The electronic device 101 according to certain embodiments may further include a communication circuit (e.g., the communication module 190 in FIG. 1) that is operatively connected to the processor 120. The instructions may cause the processor 120 to transmit the at least one calculated first feature value and the at least one calculated second feature value through the communication circuit to an external electronic device (e.g., the electronic device 102, 104, or 108 in FIG. 1), and receive the third result value from the external electronic device 102, 104, or 108.

Figure 2:
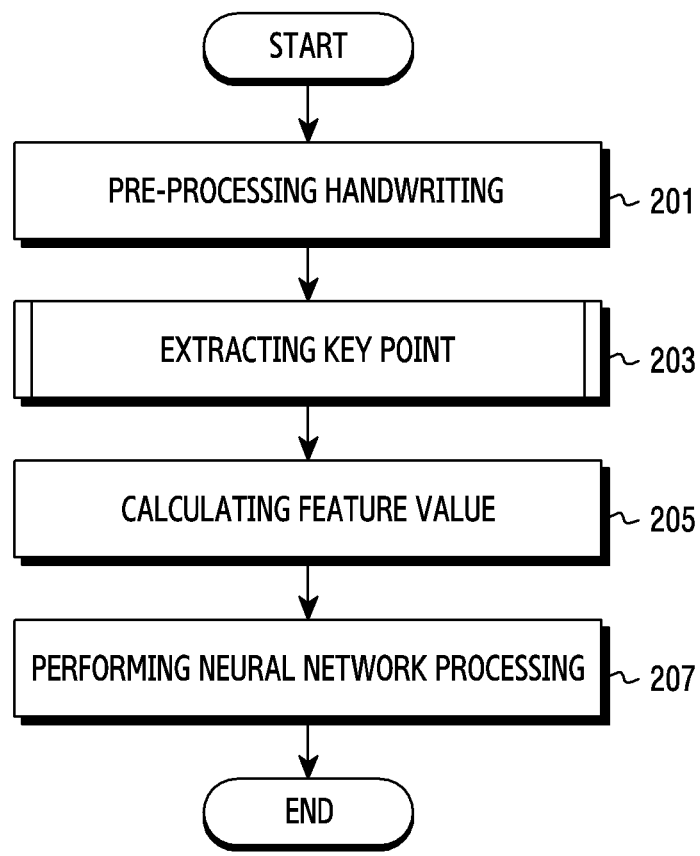
FIG. 2 is a flowchart of handwriting slope correction performed by an electronic device according to certain embodiments.

FIG. 2 is a flowchart of handwriting slope correction performed by an electronic device (e.g., the electronic device 101 in FIG. 1) according to certain embodiments.

After receiving some handwriting (e.g., by a user inputting handwriting inputs to a touch screen using a stylus or a finger), the electronic device 101 according to certain embodiments may perform a pre-processing operation on at least some of the user's handwriting in operation 201. To this end, the electronic device 101 may receive a user's handwritten input through a touch-enabled display (e.g., the display device 160 in FIG. 1). For another example, the electronic device 101 may receive data including user's handwriting, as transmitted from one or more external electronic devices (e.g., the electronic device 102 or 104 in FIG. 1) and received through a communication module (e.g., the communication module 190 in FIG. 1).

The user's handwriting may include characters handwritten by the user, including for example, letters, numbers, or symbols according to certain embodiments.

The processor (e.g., the processor 120 in FIG. 1) of the electronic device 101 may, for example, divide handwriting into character strings as a pre-processing operation of the user's handwriting when the handwriting includes a plurality of character strings. As a pre-processing operation for user's handwriting, the processor 120 may resize the handwriting, for example, to a specific size in a range utilized to perform a subsequent processing operation. As a pre-processing operation for user's handwriting, the processor 120 may, for example, perform interpolation in which when points constituting the handwriting have relatively long distance therebetween, one or more points are added between the points, or when points constituting the handwriting have relatively short distances therebetween, one or more of the points are deleted.

The processor 120 may extract "corpus line key points" and "base line key points" from characters constituting handwriting in operation 203. According to certain embodiments, the phrase "corpus line" may refer to positions of key points to be extracted from a top of a character, and the phrase "base line" may refer to positions of key points to be extracted from a bottom of a character may be referred to as a base line. Accordingly, hereinafter, key points extracted from a corpus line at the top may be referred to as corpus line key points, and key points extracted from a base line at the bottom may be referred to as base line key points. It is noted that other points within the characters may be utilized for the corpus line and base line, as is desirable.

To the end, the processor 120 may analyze handwriting to identify character codes for the characters included in the handwritten text, and to select an initial reference area, based on an outline of the recognized characters.

The processor 120 may select an effective area within a character from the initial reference area. The processor 120 may, for example, analyze a histogram distribution of an area of a character, and extract an effective area within the character, at a specific ratio. The processor 120 may correct an upper and a lower effective area of the character according to the type of the recognized character. The processor 120 may analyze character area information to separate the left and the right effective area of the character in order to ensure mutually exclusive effective areas when the characters overlap or overlay each other.

The processor 120 may exclude a character having low reliability, from characters considered for the key point extraction process. For example, the processor 120 may determine the effectiveness or reliability of a character by comparing an effective area size of the character with character code information. The processor 120 may then exclude a character having low effectiveness/reliability from the key point extraction process.

The processor 120 may extract key points according to the type of a character. The processor 120 may determine a type of a character according to a character code, and extract a corpus line key point and a base line key point of the character according to the type of the character.

The processor 120 may calculate slope feature values of the extracted key points in operation 205. The processor 120 may calculate, for example, one or more feature values, which may be defined by comparison values between the key points and one or more other key points. The feature values may be defined by slope values between the key points and one or more other key points. The processor 120 may calculate, as corresponding feature values, slope values between corpus line and/or base line key points of characters chronologically constituting handwriting according to the order in which the handwriting is written and one or more other key points.

The processor 120 may perform recurrent neural network (RNN) processing on extracted feature values of one or more key points of the characters constituting handwriting in operation 207.

The processor 120 may independently perform calculation processing on feature values of corpus line key points and feature values of base line key points of characters constituting handwriting. The processor 120 may chronologically and sequentially input key points so as to allow information to be sequentially and individually processed. The processor 120 may, for example, independently perform primary neural network calculation on corpus line key points and base line key points and then perform integrated secondary neural network calculation on the output values. The neural network calculation may be performed repeatedly two or more times in each step.

The processor 120 may integrate output values obtained by separately performing neural network calculation processing on corpus line and base line feature values and re-perform neural network calculation processing on the integrated output values in one "fully connected" neural network (e.g., a neural network having a series of 'fully connected' layers, in which each node or "neuron" is connected to every other node or "neuron," per set of layers). The processor 120 may include one or more fully connected neural networks. The processor 120 may perform, for example, primary fully connected neural network processing on the integrated output value and further perform secondary fully connected neural network processing on the output value obtained by the primary processing. The fully connected neural network processing may be repeatedly performed two or more times.

The processor 120 may correct handwriting according to a final output value obtained as a result of the neural network processing. The processor 120 may correct a slope of handwriting according to, for example, a finally output slope value obtained as a result of the neural network processing. The processor 120 may display the handwriting having a corrected slope on a display (e.g., the display device 160 in FIG. 1).

Certain embodiments mainly describe, by way of example, handwriting slope correction performed by the electronic device 101. However, the processor 120 of the electronic device 101, when desirable, may perform handwriting slope correction by transmitting or receiving data to or from an external electronic device 102 or 104 or a server 108 linked thereto through a communication module (e.g., the communication module 190 in FIG. 1). For example, the processor 120 may transmit a user handwriting image to the external electronic device 102 or 104 or the server 108 through the communication module 190, the external electronic device 102 or 104 or the server 108 may perform operations for the above-described correction processing of the user handwriting image, and then processor 120 may receive a slope value as the final result value from the external electronic device 102 or 104 or the server 108 through the communication module 190. The processor 120 may perform a specific operation among the operations for the above-described correction processing with the external electronic device 102 or 104 or the server 108 linked thereto. The processor 120 may, for example, transmit key points and/or feature values extracted from handwriting to the external electronic device 102 or 104 or the server 108 through the communication module 190 and receive, through the communication module 190, a result value obtained through the neural network processing operation performed by the external electronic device 102 or 104 or the server 108.

The processor 120 may transmit handwriting data and a final result value for handwriting slope correction to the external electronic device 102 or 104 or the server 108 through the communication module 190. The processor 120 may receive, through the communication module 190, various update data for the handwriting slope correction according to neural network learning.

Figures 3A, 3B, 3C, 3D, 3E:
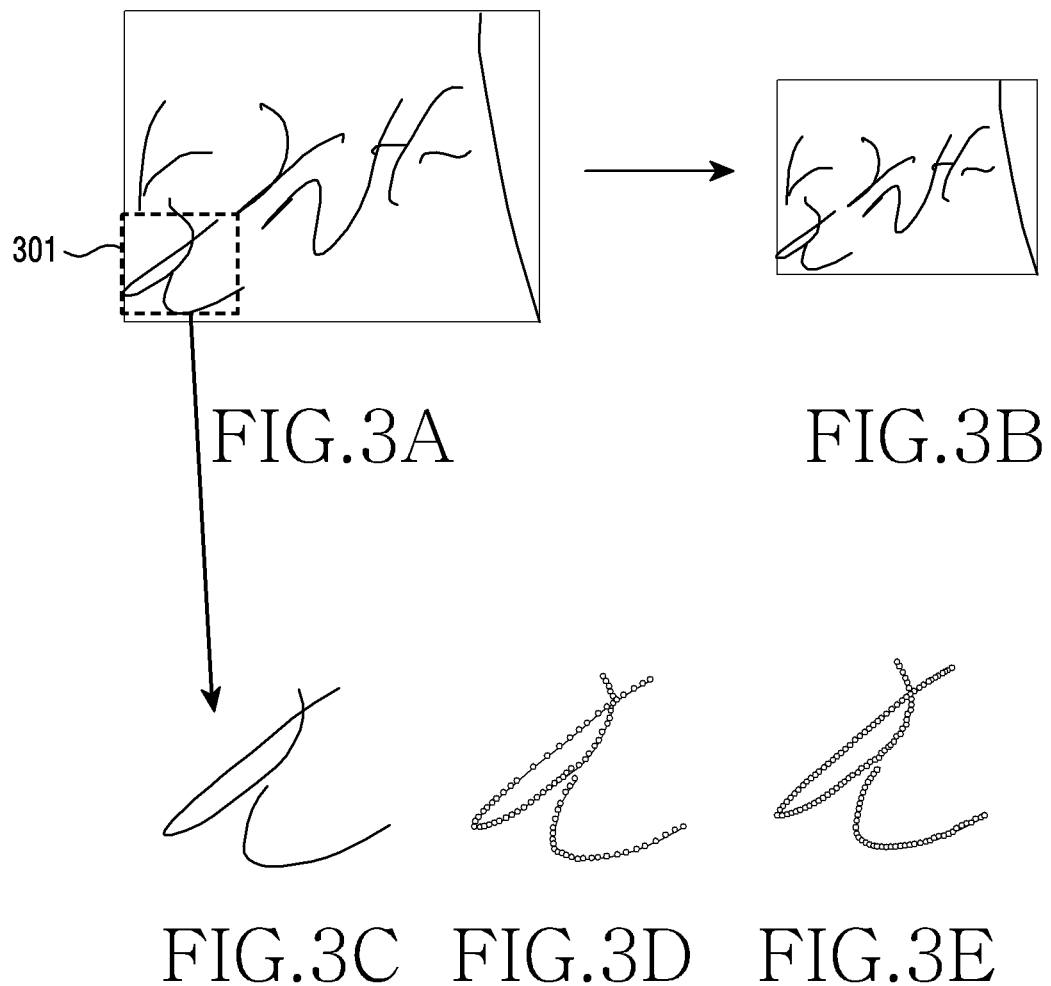
FIG. 3A illustrates an example of a pre-processing operation of handwriting, performed by an electronic device according to certain embodiments.
FIG. 3B illustrates an example of a pre-processing operation of handwriting, performed by an electronic device according to certain embodiments.
FIG. 3C illustrates an example of a pre-processing operation of handwriting, performed by an electronic device according to certain embodiments.
FIG. 3D illustrates an example of a pre-processing operation of handwriting, performed by an electronic device according to certain embodiments.
FIG. 3E illustrates an example of a pre-processing operation of handwriting, performed by an electronic device according to certain embodiments.

FIG. 3A illustrates an example of a handwriting pre-processing operation performed by an electronic device (e.g., the electronic device 101 in FIG. 1) according to certain embodiments, FIG. 3B illustrates an example of a handwriting pre-processing operation performed by an electronic device (e.g., the electronic device 101 in FIG. 1) according to certain embodiments, FIG. 3C illustrates an example of a handwriting pre-processing operation performed by an electronic device (e.g., the electronic device 101 in FIG. 1) according to certain embodiments, FIG. 3D illustrates an example of a handwriting pre-processing operation performed by an electronic device (e.g., the electronic device 101 in FIG. 1) according to certain embodiments, and FIG. 3E illustrates an example of a handwriting pre-processing operation performed by an electronic device (e.g., the electronic device 101 in FIG. 1) according to certain embodiments.

As a pre-processing operation for the user's handwriting, the processor (e.g., the processor 120 in FIG. 1) of the electronic device 101 may, for example, divide handwriting into character strings when the handwriting includes a plurality of character strings. The processor 120 may sequentially perform slope correction processing operations on the plurality of divided character strings in the order in which the characters are input, for example, in the order from the highest string to the lowest string and from the left to the right. The processor 120 may, for example, separately perform slope correction processing operations on each of the plurality of divided character strings.

Referring to FIGS. 3A to 3E, the processor 120 may resize the user's handwriting of FIG. 3A to a specific size in a range utilized to perform a subsequent processing operation, for example, from a size of about 400×300 pixels, for example, to a size of about 300×225 pixels as given in the user's handwriting of FIG. 3B. Since the original size of input handwriting is not identical, the resizing of the handwriting may be performed, for example, based on the height of the handwriting.

Reference will be made to a portion 301 of the handwriting of FIG. 3A written by the user's hand. The portion 301 includes strokes as shown in FIG. 3C and, in particular, includes points as shown in FIG. 3D, which are detected at regular time intervals, spaced apart according to the user's handwriting speed (e.g., the speed at which the handwriting is input to the touchscreen). As the user may not move the writing implement at a uniform speed during input, the distances between the points may not be equal.

Accordingly, as shown in FIG. 3E, the processor 120 may perform pre-processing which adds and/or adjusts points in the handwritten character, such that respective distances between points forming the character are set to be substantially equal. This may be accomplished by performing interpolation where, for a particular stroke including multiple points that have distances therebetween greater than a set distance threshold, one or more points may be added between the points. Similarly, for a stroke including points having relatively distances therebetween shorter than a set distance threshold, one or more points may be deleted.

Figure 4:
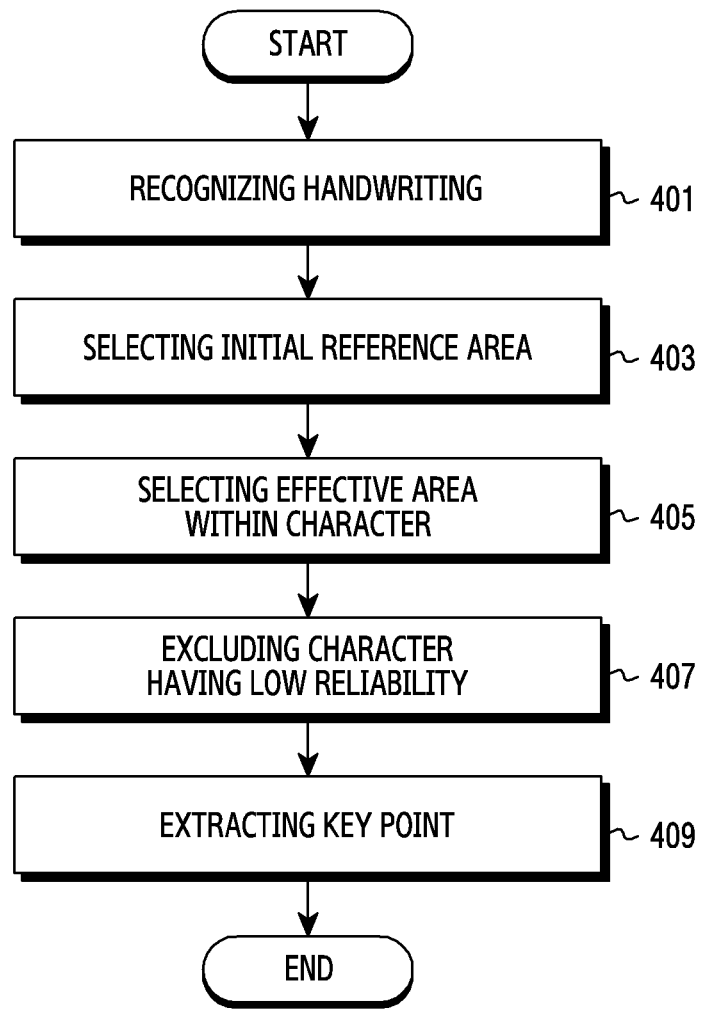
FIG. 4 is a flowchart of key point extraction performed by an electronic device according to certain embodiments.
Figure 5A:
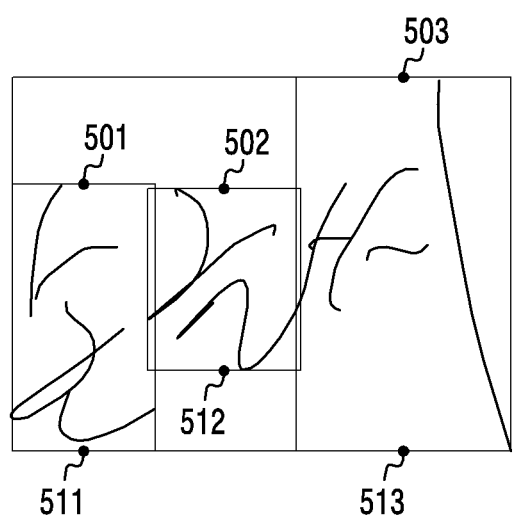
FIG. 5A illustrates an example of an initial reference point selecting operation performed by an electronic device according to certain embodiments and FIG. 5B illustrates an example of an initial reference point selecting operation performed by an electronic device according to certain embodiments.
Figure 5B:
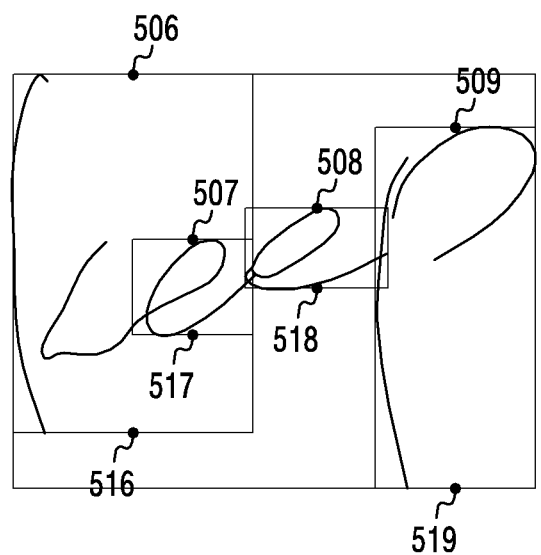
Figure 6A:
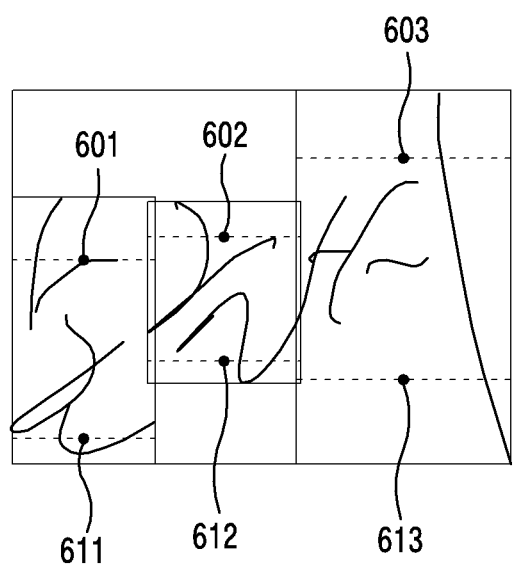
FIG. 6A illustrates an example of an operation of selecting an effective area within a character, performed by an electronic device according to certain embodiments
Figure 6B:
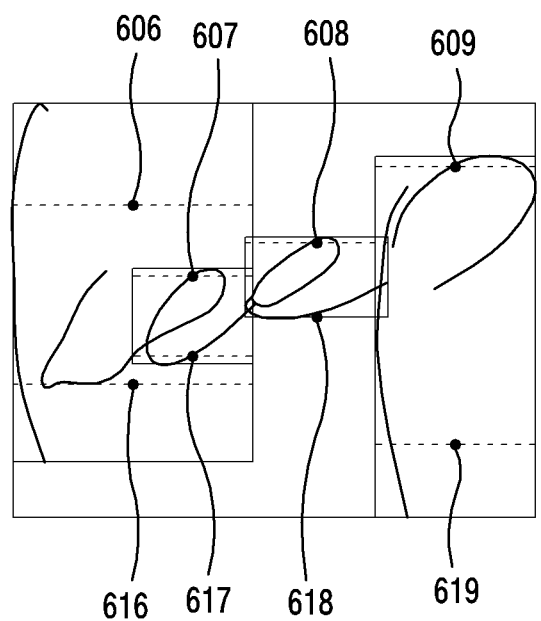
FIG. 6B illustrates an example of an operation of selecting an effective area within a character, performed by an electronic device according to certain embodiments.
Figure 7A:
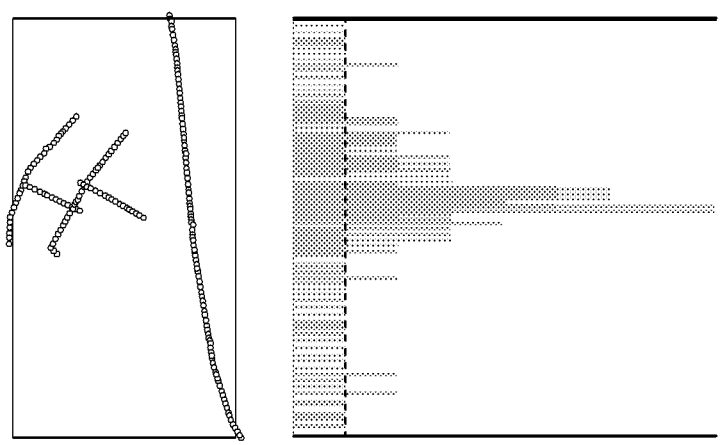
FIG. 7A illustrates an example of an operation of selecting an effective area within a character, performed by an electronic device according to certain embodiments.
Figure 7B:
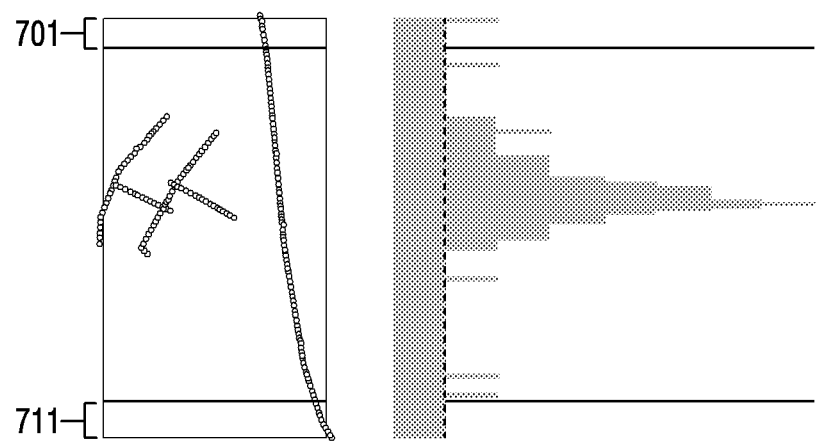
FIG. 7B illustrates an example of an operation of selecting an effective area within a character, performed by an electronic device according to certain embodiments.
Figure 7C:
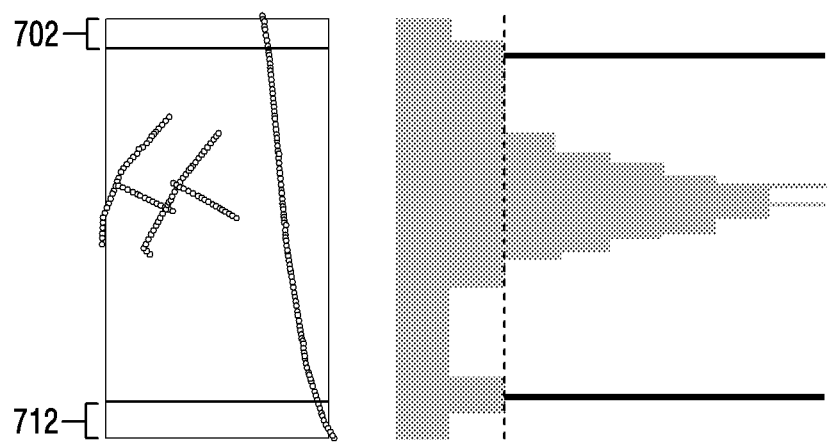
FIG. 7C illustrates an example of an operation of selecting an effective area within a character, performed by an electronic device according to certain embodiments.
Figure 7D:
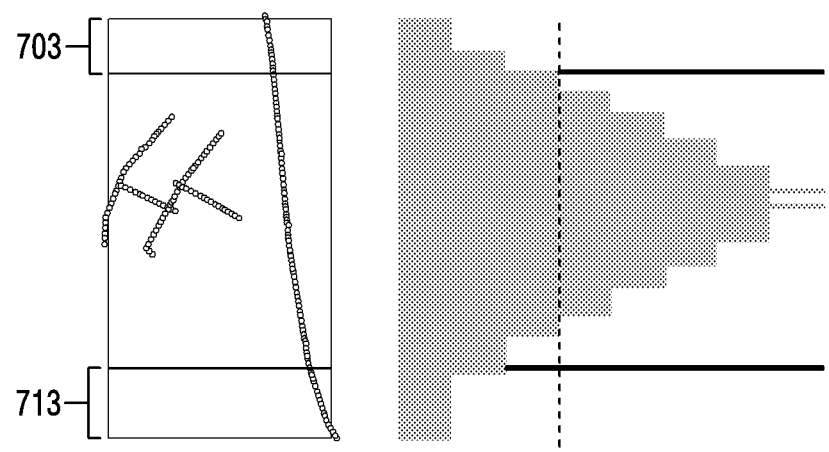
FIG. 7D illustrates an example of an operation of selecting an effective area within a character, performed by an electronic device according to certain embodiments.
Figure 8A:
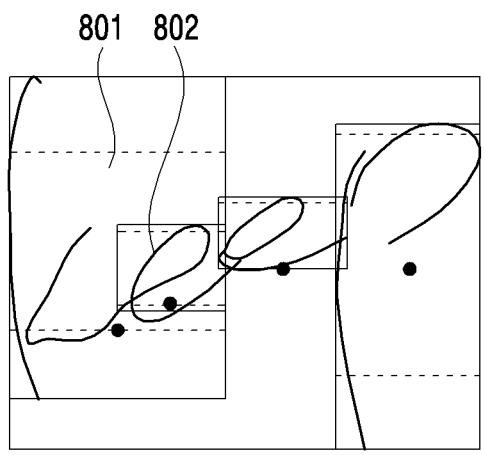
FIG. 8A illustrates an example of an operation of selecting an effective area within a character, performed by an electronic device according to certain embodiments.
Figure 8B:
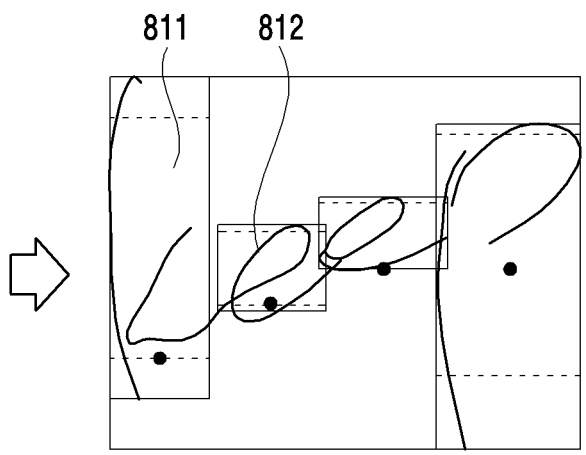
FIG. 8B illustrates an example of an operation of selecting an effective area within a character, performed by an electronic device according to certain embodiments.
Figure 9A:
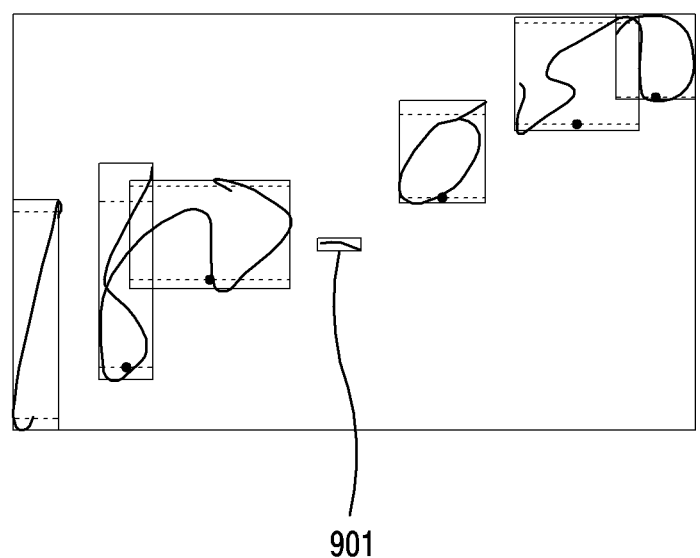
FIG. 9A illustrates an example of an operation of excluding a character having low reliability, performed by an electronic device according to certain embodiments.
Figure 9B:
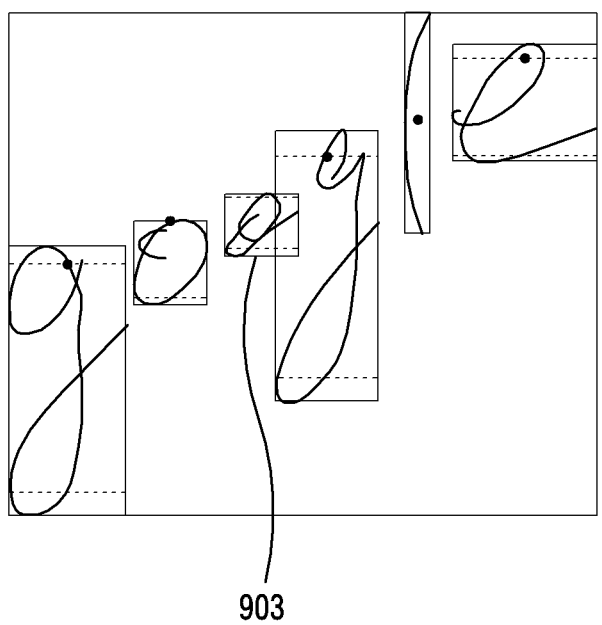
FIG. 9B illustrates an example of an operation of excluding a character having low reliability (e.g., a reliability rating less than a predetermined threshold), performed by an electronic device according to certain embodiments.
Figure 9C:
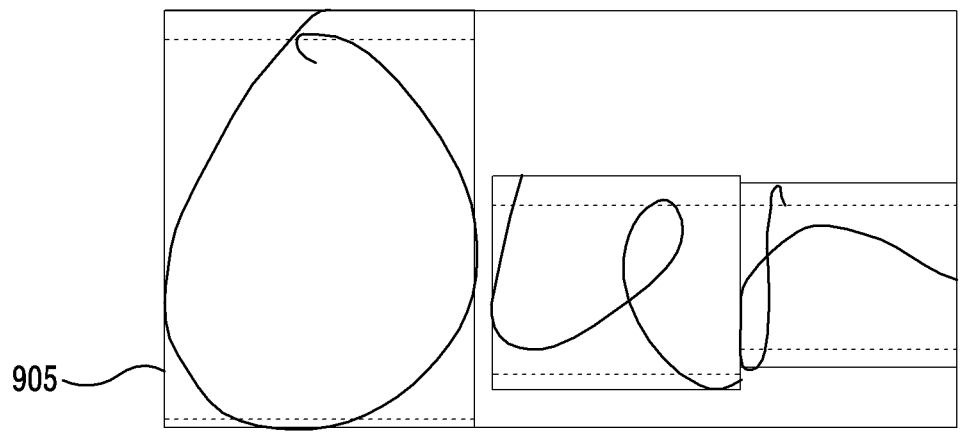
FIG. 9C illustrates an example of an operation of excluding a character having low reliability, performed by an electronic device according to certain embodiments.
Figure 10A:
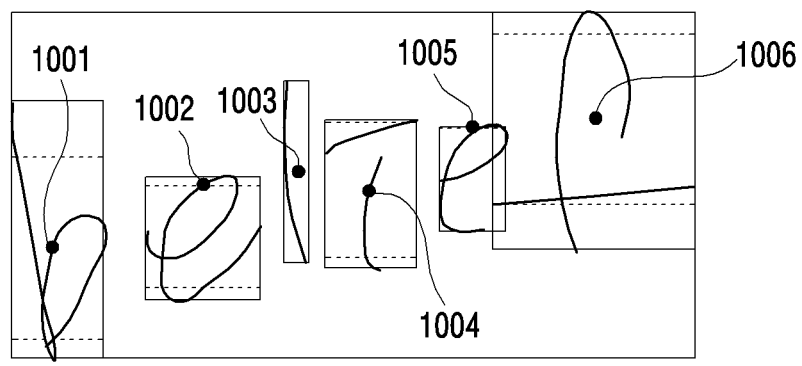
FIG. 10A is a diagram illustrating an example of an operation of extracting a key point, performed by an electronic device according to certain embodiments
Figure 10B:
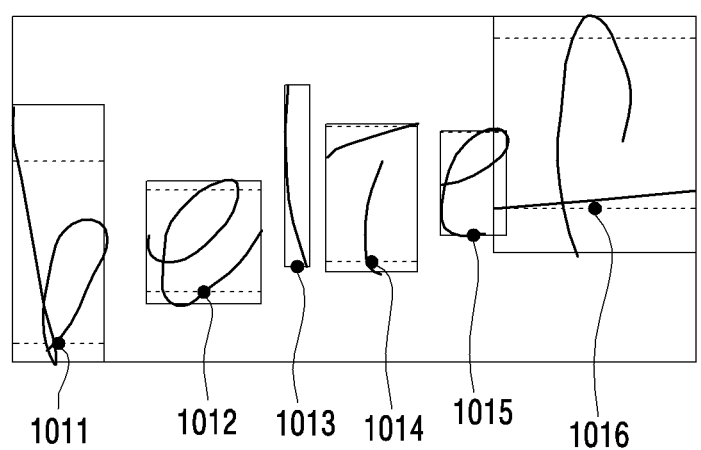
FIG. 10B is a diagram illustrating an example of an operation of extracting a key point, performed by an electronic device according to certain embodiments.
Figure 11:
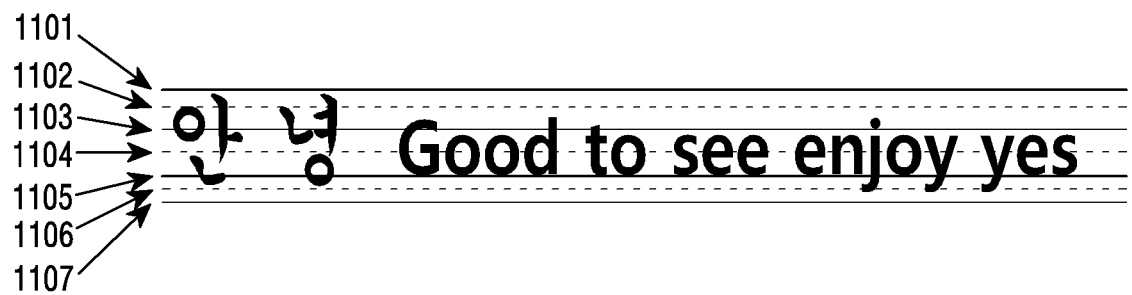
FIG. 11 illustrates an example of an operation of extracting a key point, performed by an electronic device according to certain embodiments.
Figure 12:
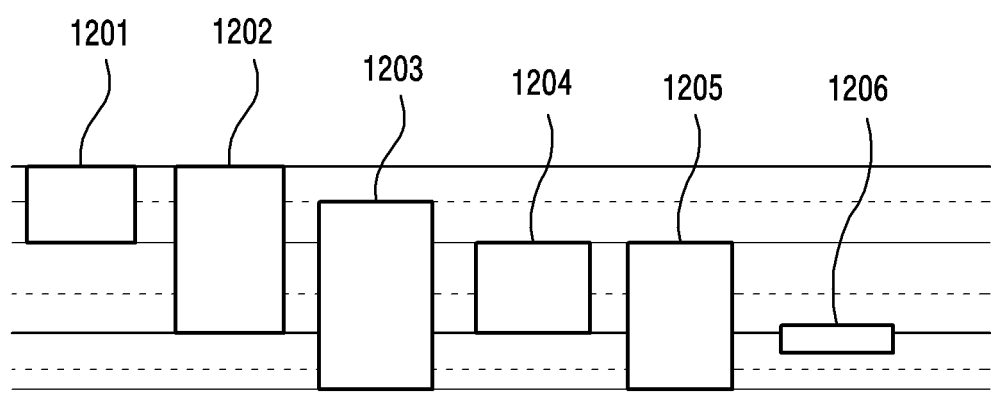
FIG. 12 illustrates an example of an operation of extracting a key point, performed by an electronic device according to certain embodiments.
Figure 13A:
FIG. 13A illustrates an example of an operation of extracting a key point, performed by an electronic device according to certain embodiments
Figure 13B:
FIG. 13B illustrates an example of an operation of extracting a key point, performed by an electronic device according to certain embodiments.
Figure 14A:
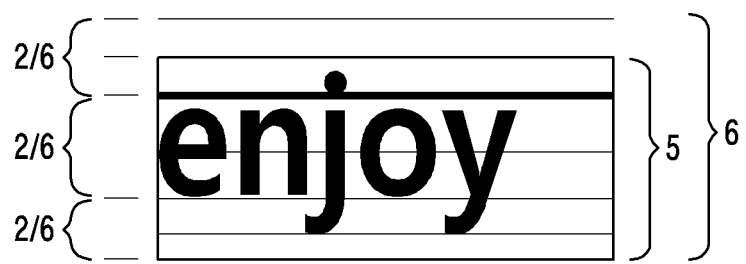
FIG. 14A illustrates an example of an operation of extracting a key point, performed by the electronic device according to certain embodiments
Figure 14B:
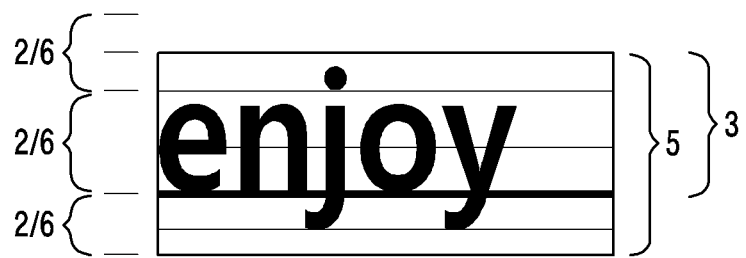
FIG. 14B illustrates an example of an operation of extracting a key point, performed by an electronic device according to certain embodiments.

FIG. 4 is a flowchart of key point extraction performed by an electronic device (e.g., the electronic device 101 in FIG. 1) according to certain embodiments. FIG. 5A illustrates an example of a key point extracting operation performed by the electronic device 101 according to certain embodiments, FIG. 5B illustrates an example of a key point extracting operation performed by the electronic device 101 according to certain embodiments, FIG. 6A illustrates an example of a key point extracting operation performed by the electronic device 101 according to certain embodiments, FIG. 6B illustrates an example of a key point extracting operation performed by the electronic device 101 according to certain embodiments, FIG. 7A illustrates an example of a key point extracting operation performed by the electronic device 101 according to certain embodiments, FIG. 7B illustrates an example of a key point extracting operation performed by the electronic device 101 according to certain embodiments, FIG. 7C illustrates an example of a key point extracting operation performed by the electronic device 101 according to certain embodiments, FIG. 7D illustrates an example of a key point extracting operation performed by the electronic device 101 according to certain embodiments, FIG. 8A illustrates an example of a key point extracting operation performed by the electronic device 101 according to certain embodiments, FIG. 8B illustrates an example of a key point extracting operation performed by the electronic device 101 according to certain embodiments, FIG. 9A illustrates an example of a key point extracting operation performed by the electronic device 101 according to certain embodiments, FIG. 9B illustrates an example of a key point extracting operation performed by the electronic device 101 according to certain embodiments, FIG. 9C illustrates an example of a key point extracting operation performed by the electronic device 101 according to certain embodiments, FIG. 10A illustrates an example of a key point extracting operation performed by the electronic device 101 according to certain embodiments, FIG. 10B illustrates an example of a key point extracting operation performed by the electronic device 101 according to certain embodiments, FIG. 11 illustrates an example of a key point extracting operation performed by the electronic device 101 according to certain embodiments, FIG. 12 illustrates an example of a key point extracting operation performed by the electronic device 101 according to certain embodiments, FIG. 13A illustrates an example of a key point extracting operation performed by the electronic device 101 according to certain embodiments, FIG. 13B illustrates an example of a key point extracting operation performed by the electronic device 101 according to certain embodiments, FIG. 14A illustrates an example of a key point extracting operation performed by the electronic device 101 according to certain embodiments, and FIG. 14B illustrates an example of a key point extracting operation performed by the electronic device 101 according to certain embodiments. Hereinafter, the key point extraction operation will be described with reference to the drawings.

The processor (e.g., the processor 120 in FIG. 1) of the electronic device 101 may identify relevant character codes (e.g., known characters from a prestored character set, character map or character encoding) by visually recognizing characters indicated in the user's handwriting in operation 401. The processor 120 may divide characters constituting pre-processed handwriting (as described with reference to FIG. 3) into individual characters, and identify character codes corresponding to the divided individual characters. A memory (e.g., the memory 130 in FIG. 1) may store software (e.g., the program 140) that includes one or more instructions, and various data, including the character codes utilized for handwriting recognition. The processor 120 may recognize, for example, character codes, such as Korean characters "손", "글", and "써" from the handwriting (e.g., the handwriting of FIG. 3B), which are pre-processed according to the process shown in FIGS. 3A to 3E.

The processor 120 may select initial reference areas for each of the characters constituting the handwriting in operation 403. FIG. 5A illustrates an example of an initial reference area selecting operation performed by the electronic device 101 according to certain embodiments, and FIG. 5B illustrates an example of an initial reference area selecting operation performed by the electronic device 101 according to certain embodiments.

The processor 120 may select, as an initial reference area, for example, a rectangle (initial reference area) forming the boundary of each character area and select the top center point and the bottom center point of the selected initial reference area as an initial top reference point and an initial bottom reference point, respectively. Referring to FIG. 5A, the initial top reference points may be top center points 501, 502, and 503 of the boundaries of character areas, and the initial bottom reference points may be bottom center points 511, 512, and 513 of the boundaries of character areas. Referring to FIG. 5B, the initial top reference points may be top center points 506, 507, 508, and 509 of the boundaries of character areas, and the initial bottom reference points may be bottom center points 516, 517, 518, and 519 of the boundaries of character areas. The initial reference points may be a reference for extracting character area information. Unlike printed and encoded fonts, due to the variable nature of handwriting, written characters may have various and unequal heights and widths. Accordingly, the result is initial reference points may be distributed in various positions, as shown in FIGS. 5A and 5B.

The processor 120 may select an effective area within a character in operation 405. FIG. 6A illustrates an example of an operation of selecting an effective area within a character, performed by an electronic device, according to certain embodiments, and FIG. 6B illustrates an example of an operation of selecting an effective area within a character, performed by an electronic device, according to certain embodiments.

Referring to FIGS. 5A and 6A, the processor 120 may select effective areas within the Korean characters "손", "글" and "써", based on the initial top reference points 501, 502, and 503 and the initial bottom reference points 511, 512, and 513 of the characters, and accordingly extract modified second top reference points 601, 602, and 603 and second bottom reference points 611, 612, and 613. Referring to the drawings, it can be seen that the right stroke "1" of the character "써" is excessively long, and thus the effective area of the character is corrected as pertaining to a vertical direction, by removing large portions of the upper and the lower areas of the stroke.

Referring to FIGS. 5B and 6B, the processor 120 may select effective areas within characters "k", "e", "e", and "p", based on the initial top reference points 506, 507, 508, and 509 and the initial bottom reference points 516, 517, 518, and 519 of the characters, and accordingly extract modified second top reference points 606, 607, 608, and 609 and second bottom reference points 616, 617, 618, and 619. Referring to the drawings, it can be seen that the left stroke "1" of the character "k" is too long and thus the effective area of the character will be corrected in the vertical direction, by removing portions of the upper and the lower areas, especially a large portion of the lower area of the stroke. Further, it can be seen that the left stroke "1" of the character "p" is too long and thus the effective area of the character will be corrected in the vertical direction by removing a portion of the lower area of the stroke.

The processor 120 may select an effective area within a character, for example, based on the handwritten stroke information. FIG. 7A illustrates an example of an operation of selecting an effective area within a character, performed by the electronic device 101, according to certain embodiments, FIG. 7B illustrates an example of an operation of selecting an effective area within a character, performed by the electronic device 101, according to certain embodiments, FIG. 7C illustrates an example of an operation of selecting an effective area within a character, performed by the electronic device 101, according to certain embodiments, and FIG. 7D illustrates an example of an operation of selecting an effective area within a character, performed by the electronic device 101, according to certain embodiments.

The processor 120 may select an effective area within a character, based on a histogram distribution. The processor 120 may select an effective area within a character to derive a second top and a second bottom reference point from an initial top and an initial bottom reference point, respectively. For example, the processor 120 may analyze a histogram distribution of a character area of a character and extract an effective inner area within the character in a specific ratio to the character areas, based on the existing initial top and bottom reference points.

Referring to FIGS. 7A to 7D, it can be seen that the smoothing effect operates differently according to how the window size is set to different values. FIG. 7A illustrates an example in which the window size is set to "0," and thus, the smoothing effect may be insignificant. Referring to FIG. 7B, the window size is set to, for example, "10," and the area left after removing upper and lower areas having a low distribution in the overall histogram distribution, in a specific ratio, for example, removing the upper 5% area 701 and/or the lower 5% area 711, may be selected as the effective area within the character. Referring to FIG. 7C, the window size is set to, for example, "20," and the area left after removing the upper 5% area 702 and/or the lower 6% area 712 may be selected as the effective area within the character. Referring to FIG. 7D, the window size may be set to, "30," and the area left after removing the upper 10% area 703 and/or the lower 13% area 713 may be selected as the effective area within the character.

The processor 120 may select an effective area within a character by correcting the left and the right area of the character. FIG. 8A illustrates an example of an operation of selecting an effective area within a character, performed by an electronic device, according to certain embodiments, and FIG. 8B illustrates an example of an operation of selecting an effective area within a character, performed by an electronic device, according to certain embodiments.

The processor 120 may analyze character area information to separate the left and right effective areas of characters in order to ensure mutually exclusive effective areas when the characters overlap or overlay each other. In a language such as English that can be continuously written from the nature of handwriting, there may be a need to separate character areas that overlap or overlay each other. The separation of the character areas may also be performed in the handwriting recognition operation.

Referring to FIGS. 8A and 8B, an area 801 of the first character "k" and an area 802 of the second character "e" of handwriting of FIG. 8A overlap each other. Accordingly, the processor 120 may separate these areas into an area 811 of the first character "k" and an area 812 of the second character "e", as shown in handwriting of FIG. 8B.

The processor 120 may exclude a character having low reliability from key point extraction targets in operation 407. FIG. 9A illustrates an example of an operation of excluding a character having low reliability, performed by an electronic device, according to certain embodiments, FIG. 9B illustrates an example of an operation of excluding a character having low reliability, performed by an electronic device, according to certain embodiments, and FIG. 9C illustrates an example of an operation of excluding a character having low reliability, performed by an electronic device, according to certain embodiments.

The processor 120 may determine the reliability or effectiveness of a character, for example, by comparing effective area size information of the character and/or character code information and exclude a character having low reliability from key point extraction targets.

The processor 120 may determine a character having a relatively large difference in size from the other characters as an unreliable character and exclude the corresponding character, based on effective area size information of the character, for example, the ratio of horizontal to vertical lengths of the corresponding character area size and the ratio of horizontal to a vertical lengths of the other character area sizes. The processor 120 may determine the reliability of a character by comparing character area size information with a character code identified according to character recognition to compare the character area size with a character area reference size that is generally utilized, and exclude a character having low reliability.

Referring to FIG. 9A, an area 901 occupied by a comma may have a relatively small effective area size of the character (e.g., the size may be less than a predetermined threshold), as compared to the other characters, and due to the small area, reference points may be extracted in positions that are significantly different from the position of a corpus line or base line. This may result in the top or bottom slope calculation being inaccurate. Accordingly, the processor 120 may determine that the comma has insufficient reliability (due to being smaller than the predetermined threshold size for a character), and exclude the comma from key point extraction processing.

Referring to FIG. 9B, an area 903 of the third character "o" has a relatively small vertical length as compared to the other characters. The processor 120 may determine that the third character "o" has low reliability which may cause low recognition accuracy (e.g., due to the size of the character being less than a predetermined threshold size) and exclude the character from key point extraction targets.

Even in a case of a string of identical characters or numerals, when a certain character has a vertical length or position significantly different from those of the other characters, the certain character may be detected as like to cause inaccurate recognition information, and thus be excluded from key point extraction targets. Referring to FIG. 9C, the handwriting may be recognized as "Our", and the size of the area 905 of the first character "O" demonstrates a significant difference when compared to the second and the third other characters "u" and "r". The difference may be detected as being greater than a predetermined difference threshold (e.g., in height or width). Therefore, the character that exceeds the preset distance threshold may be deleted. Conversely, the difference threshold may be applied in reverse, such that or the area corresponding to the second and third characters may be determined to have low reliability and may be excluded from key point extraction targets.

The processor 120 may extract the key points according to the type of character. FIG. 10A illustrates an example of a key point extracting operation performed by an electronic device according to certain embodiments, and FIG. 10B illustrates an example of a key point extracting operation performed by an electronic device according to certain embodiments. The processor 120 may determine the types of characters according to character codes recognized for the characters constituting handwriting and may extract, according to the character types, corpus line key points 1001, 1002, 1003, 1004, 1005 and 1006 of the characters as shown in FIG. 10A and base line key points 1011, 1012, 1013, 1014, 1015 and 1016 of the characters as shown in FIG. 10B.

FIG. 11 illustrates an example of a key point extracting operation performed by an electronic device (e.g., the electronic device 101 in FIG. 1) according to certain embodiments.

The processor (e.g., the processor 120 in FIG. 1) of the electronic device 101 may determine the types of characters designated according to character codes recognized for handwritten characters. The processor 120 may identify placement position information of the characters according to the type of character, place effective areas of the characters on lines horizontally divided in a specific ratio, according to the placement position information of the characters, and determine, as the position of a key point, the position of a certain line among the lines where the characters are positioned by the placement.

Referring to FIG. 11, each character may have inner division areas that are, for example, set according to six equal sections divided by seven lines from the upper line 1101 to the lower line 1107, based on the character type designated according to character codes. The processor 120 may consider a certain line on each character, such as for example, the third line 1103 from the top, as a corpus line position and may determine the position of the corresponding line 1103 as the position of a corpus line key point of the corresponding character. The processor 120 may consider a certain line on each character, for example, the third line 1105 from the bottom, as a base line position and may determine the position of the corresponding line 1105 as the position of a base line key point of the corresponding character.

FIG. 12 illustrates an example of a key point extracting operation performed by an electronic device (e.g., the electronic device 101 in FIG. 1) according to certain embodiments.

Referring to FIG. 12, placement position information according to a type of each handwritten character may be designated according to the character codes corresponding to each of the handwritten characters.

For example, according to placement position information of a character type such as quotation marks (""," ","", or '), the placement position may be in the position 1201 occupying two upper areas among the areas divided by horizontal division lines.

For example, placement position information of a character type such as "i" or "t" among English lowercase letters, or Korean letters or Chinese characters, may indicate the position 1202, which occupies four areas (e.g., the top four among the six illustrated areas) among the areas divided by horizontal division lines.

For example, according to placement position information of a character type such as "j" among English lowercase letters, the placement position may be set as the position 1203, occupying all areas except a topmost area among the areas divided by horizontal division lines.

For example, according to placement position information of a character type such as "a", "c", or "m" among English lowercase letters, the placement position may be set as the position 1204, which occupies two areas leaving two unoccupied areas above and below, from among the areas divided by horizontal division lines.

For example, according to placement position information of a character type such as "y", "g", or "p" among English lowercase letters, the placement position may be placed in the position 1205 occupying four areas and leaving the topmost two areas unoccupied, among the areas divided by horizontal division lines.

FIG. 13A illustrates an example of determining a key point position by an electronic device (e.g., the electronic device 101 in FIG. 1) according to certain embodiments, and FIG. 13B illustrates an example of determining a key point position by an electronic device (e.g., the electronic device 101 in FIG. 1) according to certain embodiments.

A character type according to a character code may be determined based on, for example, the upper type and the lower type of a character. The upper type and the lower type may be determined according to the character code, and the character type may be designated by considering the determined upper type and lower type in combination.

Referring to FIG. 13A, the upper types of individual characters may be classified into, for example, four types according to shapes or positions 1301, 1302, 1303, and 1304 of the upper portions of the characters. It is noted that the elements 1301-1304 will be used henceforth to indicate both the positions and the types. For example, English capital letters, Korean letters, or Chinese characters may be classified as a first type 1301 among the upper types of characters. For example, English lowercase letters "i", "j" or "t" may be classified as a second type 1302 among the upper types of characters. For example, English lowercase letters "a", "c", "m", "y" or "g" may be classified as a third type 1303 among the upper types of characters. For example, punctuation marks such as a period or a comma may be classified as a fourth type 1304 among the upper type of characters.

Referring to FIG. 13B, the lower types of individual characters may be classified into, for example, three types according to shapes or positions 1311, 1312, or 1313 of the lower portions of the characters. Again, it is noted that 1311-1313 will be used to refer to both the positions and the types identifiable through the positions. For example, punctuation marks such as apostrophes may be classified as a first type 1311 among the lower types of characters. For example, English lowercase letters such as "a", "d", and "i", English capital letters such as "A", Korean letters, or Chinese characters may be classified as a second type 1312 among the lower types of characters. For example, English lowercase letters, such as "y", "g", "p" or "j", may be classified as a third type 1313 among the lower types of characters.

Accordingly, based on the upper types and the lower types of characters, for example, Korean letters or Chinese characters may be classified as the first type 1301 and the second type 1312 for the upper type and the lower type thereof, respectively, and may be designated as a character type having the upper type and the lower type according to such classification. For example, an English lowercase letter "i" may be classified as the second type 1302 and the second type 1312 for the upper type and the lower type thereof, respectively and may be designated as a character type having the upper type and the lower type according to such classification. For example, an English lowercase letter "y" or "g" may be classified as the third type 1303 and the third type 1313 for the upper type and the lower type thereof, respectively, and may be designated as a character type having the upper type and the lower type according to such classification.

The processor (e.g., the processor 120 in FIG. 1) of the electronic device 101 may confirm the upper type and lower type of a character that are designated according to a character code and may identify a character type, based on the determined upper type and a lower type. The processor 120 may confirm the positions of a corpus line and a base line that are assigned for the identified character type and may extract a corpus line key point and a base line key point from the corresponding positions.

FIG. 14A illustrates an example of determining a key point position by an electronic device according to certain embodiments, and FIG. 14B illustrates an example of determining a key point position by an electronic device according to certain embodiments.

Referring to FIG. 14A, characters placed in areas divided by horizontal lines, based on placement position information according to character types, for example, the characters of the word "enjoy" may be placed over five lower areas except one upper area among a total of six areas divided starting from the top line. According to certain embodiments, for example, the characters of the word "enjoy" may have a corpus line positioned at the bottom portion of one upper area among the five lower areas over which the characters are placed, that is, on the third line (bold line) from the top line.

Referring to FIG. 14B, for example, the characters of the word "enjoy" placed over the five lower areas among the six divided areas may have a base line positioned at the bottom portion of three upper areas among the five lower areas, that is, the fourth line (bold line) from the top line.

Figure 15:
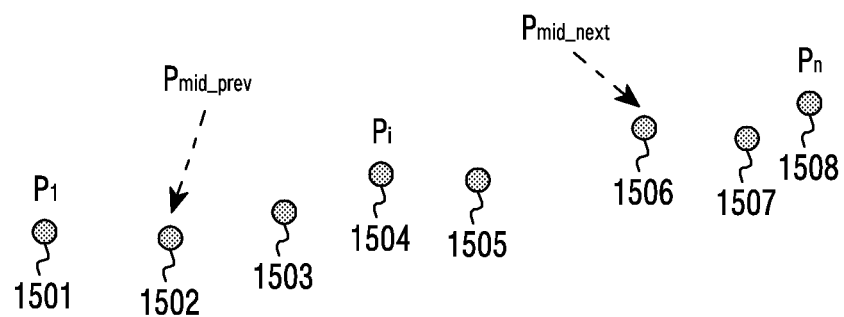
FIG. 15 illustrates an example of an operation of extracting a slope feature, performed by an electronic device according to certain embodiments.

FIG. 15 illustrates an example of an operation of extracting a slope feature value, performed by an electronic device (e.g., the electronic device 101 in FIG. 1) according to certain embodiments.

Referring to FIG. 15, at least some of key points extracted from characters included in handwriting may be referred to as, for example, a first key point ($P_1$) 1501, an $i/2_{th}$ key point ($P_{mid\_prev}$) 1502, an $(i-1)_{th}$ key point 1503, an $i_{th}$ key point ($P_i$) 1504, an $(i+1)_{th}$ key point 1505, an $(i+n)/2_{th}$ key point ($P_{mid\_next}$) 1506, an $(n-1)_{th}$ key point 1507, and an $n_{th}$ key point ($P_n$) 1508.

The processor (e.g., the processor 120 in FIG. 1) of the electronic device 101 may extract feature values of these key points, respectively. The feature values of each key point may be defined by relationship values between key points and other key points, for example, positioned in front of or behind the corresponding key points. The feature values of each key point may be defined by slope values between key points and one or more other key points positioned in front of or behind the corresponding key points.

Referring to FIG. 15, feature values, for example, the feature value of the $i_{th}$ key point 1504 may be defined by, for example, a slope value between the $i_{th}$ key point and the first key point 1501, a slope value between the $i_{th}$ key point and the $(i-1)_{th}$ key point 1503 which is a key point positioned right before the $i_{th}$ key point 1504, a slope value between the $i_{th}$ key point and the $(i+1)_{th}$ key point 1505 which is a key point positioned right after the $i_{th}$ key point 1504, a slope value between the $i_{th}$ key point and the key point 1502 positioned in a middle part of the first key point 1501 and the corresponding $i_{th}$ key point 1504, a slope value between the $i_{th}$ key point and the key point 1506 positioned in a middle part of the corresponding $i_{th}$ key point 1504 and the last key point 1508, and a slope value between the $i_{th}$ key point and the last key point 1508.

The feature values extracted from key points may be represented by the following equation 1, $$F_i^{corpus} = \{f_{ij}\}, j=1, \ldots, 6, \text{pi} \in \text{corpus line key points} \{1, \ldots, N_{corpus}\}$$ [Equation 1]

$$F_i^{base} = \{f_{ij}\}, j=1, \ldots, 6, \text{pi} \in \text{base line key points} \{1, \ldots, N_{base}\},$$

$F_i^{corpus}$ denotes a corpus line key point of the $i_{th}$ key point 1504, $F_i^{base}$ denotes a base line key point of the $i_{th}$ key point 1504, and denotes a slope value between the $i_{th}$ key point 1504 and a $j_{th}$ key point.

Meanwhile, the slope value may be represented by the following equation 2, $$\text{gradient}(q, r) = \begin{cases} \dfrac{dy(q, r)}{dx(q, r)} & q \neq r \\ 0 & q = r \end{cases}$$ [Equation 2]

q denotes a $q_{th}$ key point and r denotes an $r_{th}$ key point.

The processor 120 may sequentially extract feature values of corpus line key points and sequentially extract feature values of base line key points from characters constituting handwriting.

Figure 16:
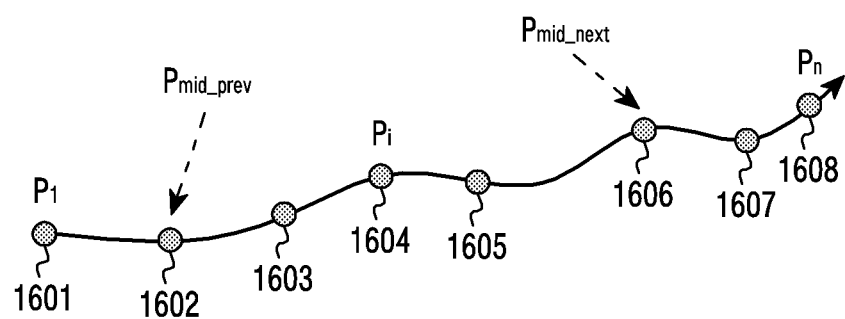
FIG. 16 illustrates an example of a neural network processing operation performed by an electronic device according to certain embodiments.

FIG. 16 illustrates an example of a neural network processing operation performed by an electronic device (e.g., the electronic device 101 in FIG. 1) according to certain embodiments.

The processor (e.g., the processor 120 in FIG. 1) of the electronic device 101 may sequentially input the extracted feature values of corpus line key points of characters constituting handwriting to a first neural network, for example, in the order of a first key point ($P_1$) 1601, an $i/2_{th}$ key point ($P_{mid\_prev}$) 1602, an $(i-1)_{th}$ key point 1603, an $i_{th}$ key point ($P_i$) 1604, an $(i+1)_{th}$ key point 1605, an $(i+n)/2_{th}$ key point ($P_{next}$) 1606, an $(n-1)_{th}$ key point 1607, and an $n_{th}$ key point ($P_n$) 1608, based on the chronological order of the key points according to the order in which the handwriting is generated from left to right.

The processor (e.g., the processor 120 in FIG. 1) of the electronic device 101 may sequentially input the extracted feature values of base line key points for characters constituting handwriting to a second neural network, for example, in the order of a first key point ($P_1$) 1601, an $i/2_{th}$ key point 1602, an $(i-1)_{th}$ key point 1603, an $i_{th}$ key point 1604, an $(i+1)_{th}$ key point 1605, an $(i+n)/2_{th}$ key point 1606, an $(n-1)_{th}$ key point 1607, and an $n_{th}$ key point 1608, based on the chronological order of the key points according to the order in which the handwriting is generated from left to right.

Figure 17:
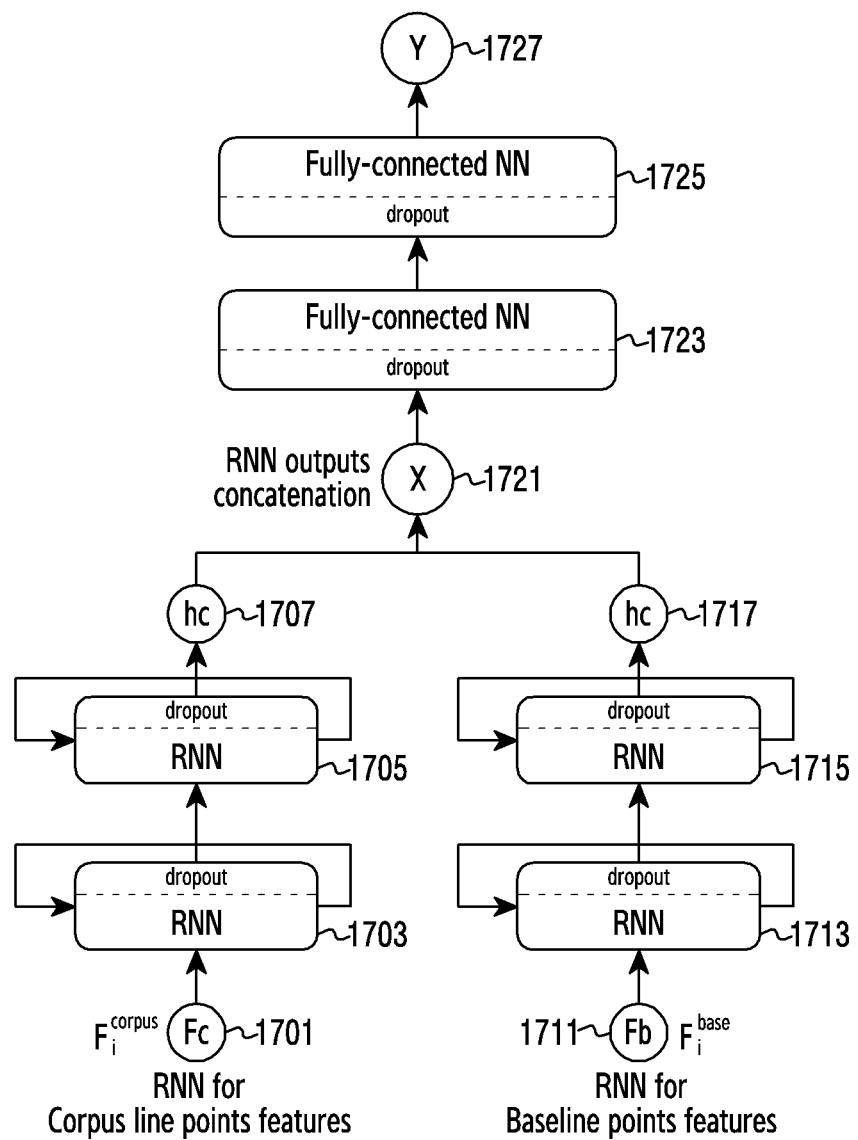
FIG. 17 illustrates an example of a neural network processing operation performed by an electronic device according to certain embodiments.

FIG. 17 illustrates an example of a neural network processing operation performed by an electronic device (e.g., the electronic device 101 in FIG. 1) according to certain embodiments.

Referring to FIG. 17, the processor (e.g., the processor 120 in FIG. 1) of the electronic device 101 may perform recurrent neural network processing on feature values extracted for key points of characters constituting handwriting.

The processor 120 may perform a separate neural network calculation processing in a separate neural network on feature values of corpus line key points and the feature values of base line key points for the characters included in the handwritten input.

The processor 120 may sequentially input the extracted feature values 1701 of corpus line key points ($F_i^{corpus}$) in to a first neural networks 1703 and/or 1705 in a chronological order, to allow information to be sequentially processed. The first neural network including networks 1703 and/or 1705 may include one or more neural processing networks. The processor 120 may re-input feature values, which have already been input to the neural network 1703 of the first neural network and thus already been processed, to the other neural network 1705 of the first neural network and may process the re-input feature values to output a first result value 1707.

The processor 120 may sequentially input the extracted feature values 1711 of base line key points ($F_i^{base}$) into a second neural network including networks 1713 and/or 1715 in the chronological order to allow information to be sequentially processed. The second neural network including networks 1713 and/or 1715 may include one or more neural processing networks. The processor 120 may re-input the feature values, which have been already input to the neural network 1713 of the second neural network and thus been processed, to the other neural network 1715 of the second neural network, and may process the re-input feature values to output a second result value 1717.

The processor 120 may integrate a first result value 1707 and a second result value 1717 in operation 1721, which are output by performing separate processes via the first neural network 1703 and/or 1705, and via the second neural network 1713 and/or 1715, and may output a third result value 1727 by utilizing neural network calculation processing in the fully connected neural network 1723 and/or 1725 which is an integrated-neural network. The integrated-neural network may include one or more fully connected neural networks.

The processor 120 may correct a slope of the input handwriting, based on a slope value which may be the final result value (e.g., third result value 1727) output from the fully connected neural network 1723 and/or 1725. The processor 120 may rotate the handwriting by an angle corresponding to the third result value 1727 and display the rotated handwriting on a display (e.g., the display device 160 in FIG. 1).

Figure 18A:
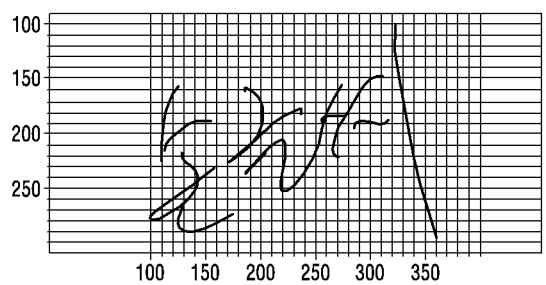
FIG. 18A illustrates a result of handwriting slope correction by an electronic device according to certain embodiments.
Figure 18B:
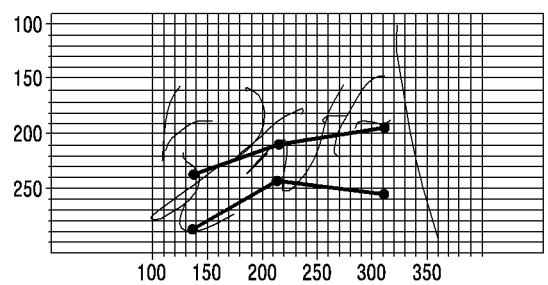
FIG. 18B illustrates a result of handwriting slope correction by an electronic device according to certain embodiments.
Figure 18C:
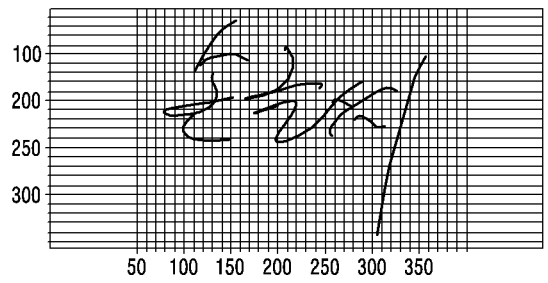
FIG. 18C illustrates a result of handwriting slope correction by an electronic device according to certain embodiments.
Figure 18D:
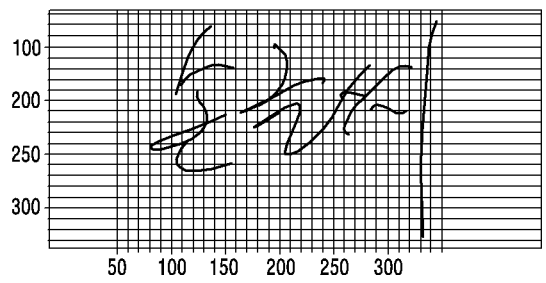
FIG. 18D illustrates a result of handwriting slope correction by an electronic device according to certain embodiments.
Figure 19A:
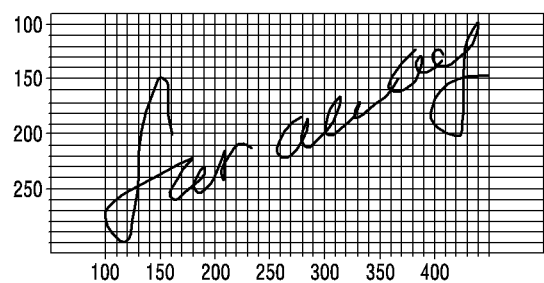
FIG. 19A illustrates a result of handwriting slope correction by an electronic device according to certain embodiments.
Figure 19B:
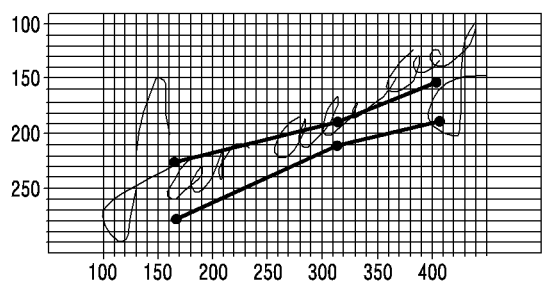
FIG. 19B illustrates a result of handwriting slope correction by an electronic device according to certain embodiments.
Figure 19C:
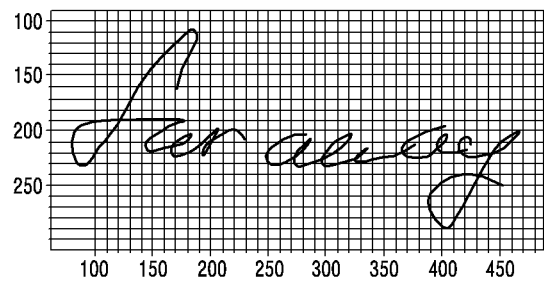
FIG. 19C illustrates a result of handwriting slope correction by an electronic device according to certain embodiments.
Figure 19D:
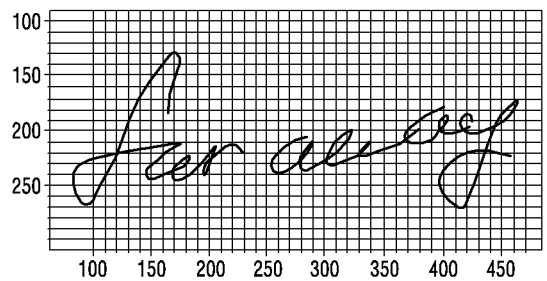
FIG. 19D illustrates a result of handwriting slope correction by an electronic device according to certain embodiments.
Figure 20A:
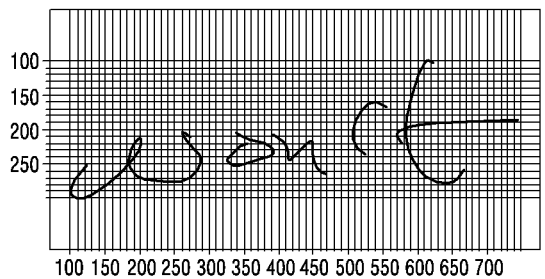
FIG. 20A illustrates a result of handwriting slope correction by an electronic device according to certain embodiments.
Figure 20B:
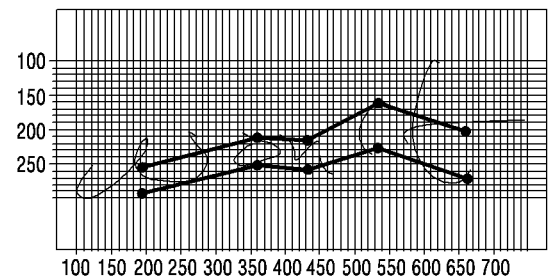
FIG. 20B illustrates a result of handwriting slope correction by an electronic device according to certain embodiments.
Figure 20C:
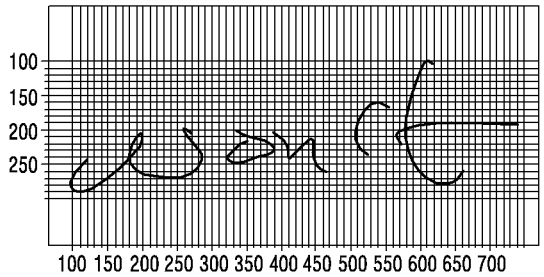
FIG. 20C illustrates a result of handwriting slope correction by an electronic device according to certain embodiments.
Figure 20D:
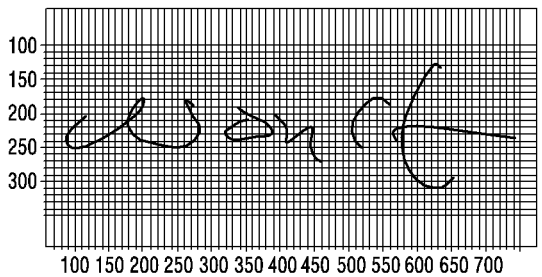
FIG. 20D illustrates a result of handwriting slope correction by an electronic device according to certain embodiments.
Figure 21A:
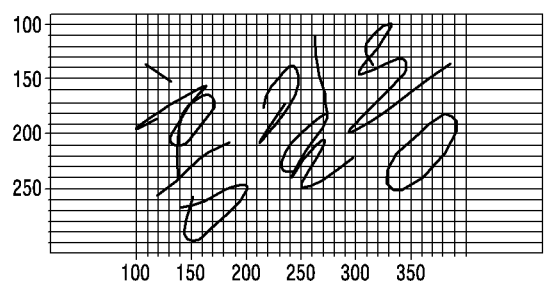
FIG. 21A illustrates a result of handwriting slope correction by an electronic device according to certain embodiments.
Figure 21B:
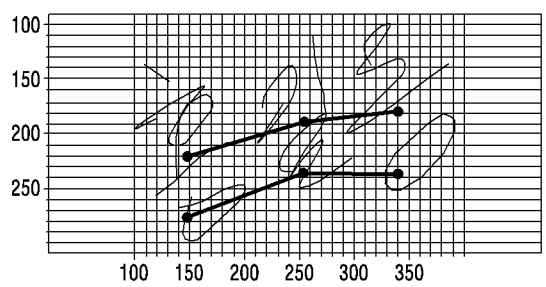
FIG. 21B illustrates a result of handwriting slope correction by an electronic device according to certain embodiments.
Figure 21C:
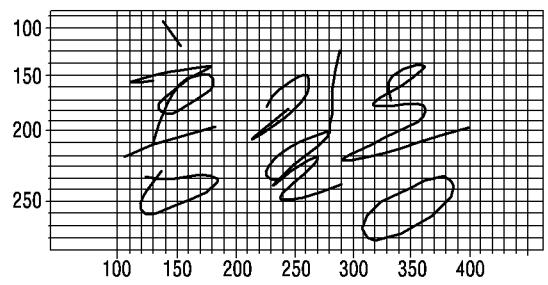
FIG. 21C illustrates a result of handwriting slope correction by an electronic device according to certain embodiments.
Figure 21D:
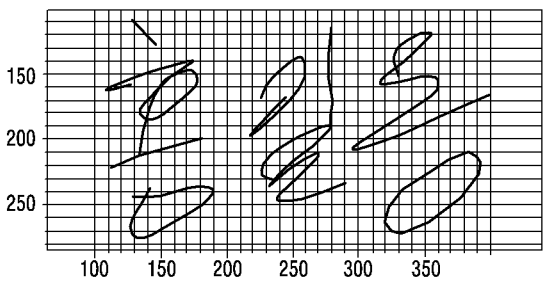
FIG. 21D illustrates a result of handwriting slope correction by an electronic device according to certain embodiments.
Figure 22A:
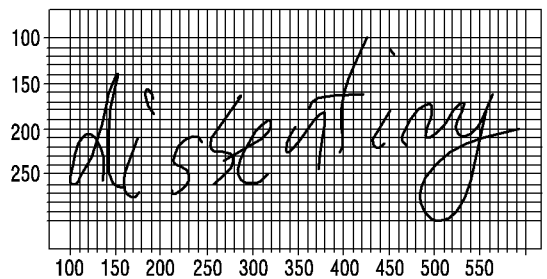
FIG. 22A illustrates a result of handwriting slope correction by an electronic device according to certain embodiments.
Figure 22B:
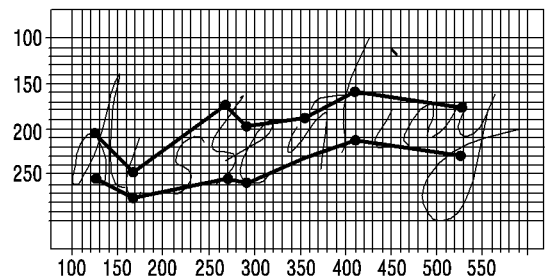
FIG. 22B illustrates a result of handwriting slope correction by an electronic device according to certain embodiments.
Figure 22C:
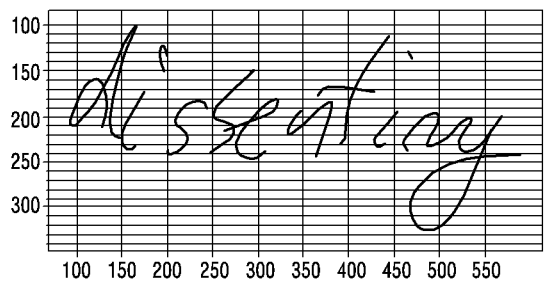
FIG. 22C illustrates a result of handwriting slope correction by an electronic device according to certain embodiments.
Figure 22D:
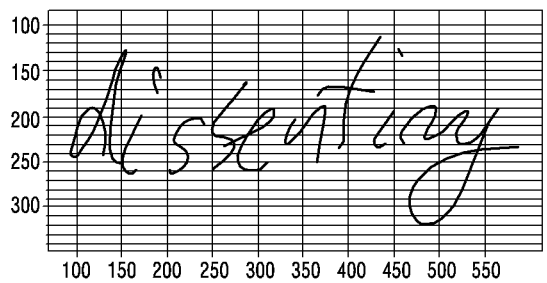
FIG. 22D illustrates a result of handwriting slope correction by an electronic device according to certain embodiments.
Figure 23A:
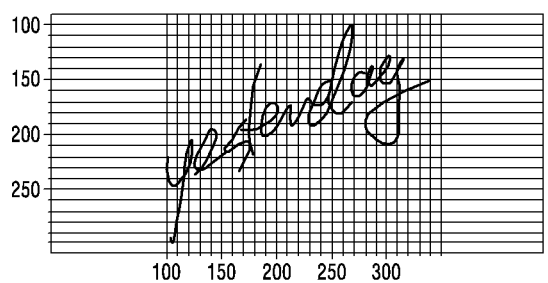
FIG. 23A illustrates a result of handwriting slope correction by an electronic device according to certain embodiments.
Figure 23B:
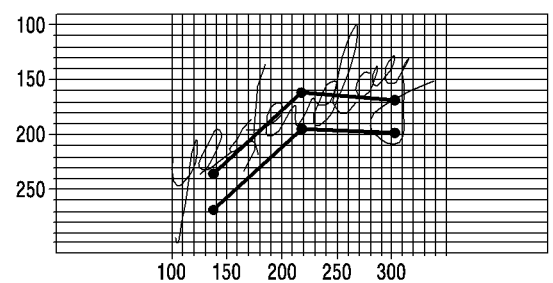
FIG. 23B illustrates a result of handwriting slope correction by an electronic device according to certain embodiments.
Figure 23C:
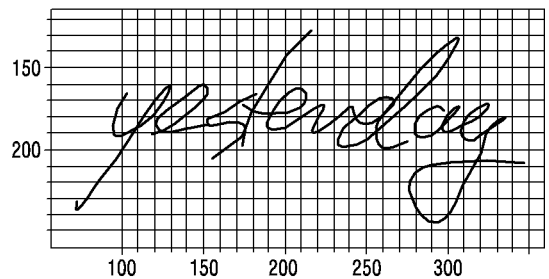
FIG. 23C illustrates a result of handwriting slope correction by an electronic device according to certain embodiments.
Figure 23D:
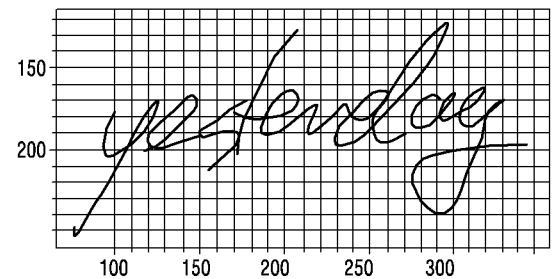
FIG. 23D illustrates a result of handwriting slope correction by an electronic device according to certain embodiments.
Figure 24A:
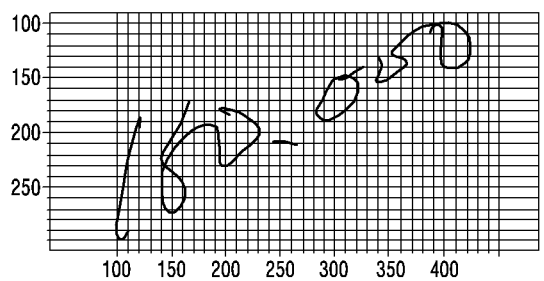
FIG. 24A illustrates a result of handwriting slope correction by an electronic device according to certain embodiments.
Figure 24B:
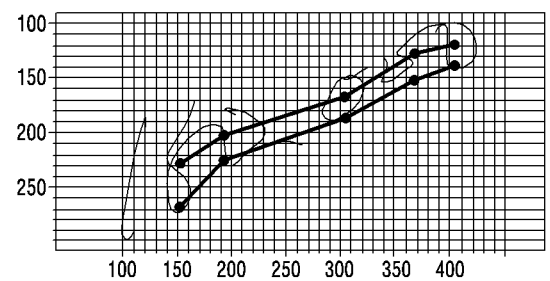
FIG. 24B illustrates a result of handwriting slope correction by an electronic device according to certain embodiments.
Figure 24C:
FIG. 24C illustrates a result of handwriting slope correction by an electronic device according to certain embodiments.
Figure 24D:
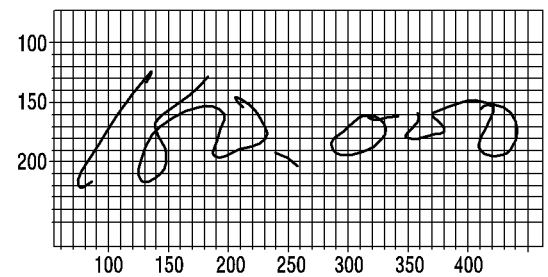
FIG. 24D illustrates a result of handwriting slope correction by an electronic device according to certain embodiments.

FIG. 18A illustrates a slope correction result of handwriting in an electronic device (e.g., the electronic device 101 in FIG. 1) according to certain embodiments, FIG. 18B illustrates a slope correction result of handwriting in an electronic device (e.g., the electronic device 101 in FIG. 1) according to certain embodiments, FIG. 18C illustrates a slope correction result of handwriting in an electronic device (e.g., the electronic device 101 in FIG. 1) according to certain embodiments, FIG. 18D illustrates a slope correction result of handwriting in an electronic device (e.g., the electronic device 101 in FIG. 1) according to certain embodiments, FIG. 19A illustrates a slope correction result of handwriting in an electronic device (e.g., the electronic device 101 in FIG. 1) according to certain embodiments, FIG. 19B illustrates a slope correction result of handwriting in an electronic device (e.g., the electronic device 101 in FIG. 1) according to certain embodiments, FIG. 19C illustrates a slope correction result of handwriting in an electronic device (e.g., the electronic device 101 in FIG. 1) according to certain embodiments, FIG. 19D illustrates a slope correction result of handwriting in an electronic device (e.g., the electronic device 101 in FIG. 1) according to certain embodiments, FIG. 20A illustrates a slope correction result of handwriting in an electronic device (e.g., the electronic device 101 in FIG. 1) according to certain embodiments, FIG. 20B illustrates a slope correction result of handwriting in an electronic device (e.g., the electronic device 101 in FIG. 1) according to certain embodiments, FIG. 20C illustrates a slope correction result of handwriting in an electronic device (e.g., the electronic device 101 in FIG. 1) according to certain embodiments, FIG. 20D illustrates a slope correction result of handwriting in an electronic device (e.g., the electronic device 101 in FIG. 1) according to certain embodiments, FIG. 21A illustrates a slope correction result of handwriting in an electronic device (e.g., the electronic device 101 in FIG. 1) according to certain embodiments, FIG. 21B illustrates a slope correction result of handwriting in an electronic device (e.g., the electronic device 101 in FIG. 1) according to certain embodiments, FIG. 21C illustrates a slope correction result of handwriting in an electronic device (e.g., the electronic device 101 in FIG. 1) according to certain embodiments, FIG. 21D illustrates a slope correction result of handwriting in an electronic device (e.g., the electronic device 101 in FIG. 1) according to certain embodiments, FIG. 22A illustrates a slope correction result of handwriting in an electronic device (e.g., the electronic device 101 in FIG. 1) according to certain embodiments, FIG. 22B illustrates a slope correction result of handwriting in an electronic device (e.g., the electronic device 101 in FIG. 1) according to certain embodiments, FIG. 22C illustrates a slope correction result of handwriting in an electronic device (e.g., the electronic device 101 in FIG. 1) according to certain embodiments, FIG. 22D illustrates a slope correction result of handwriting in an electronic device (e.g., the electronic device 101 in FIG. 1) according to certain embodiments, FIG. 23A illustrates a slope correction result of handwriting in an electronic device (e.g., the electronic device 101 in FIG. 1) according to certain embodiments, FIG. 23B illustrates a slope correction result of handwriting in an electronic device (e.g., the electronic device 101 in FIG. 1) according to certain embodiments, FIG. 23C illustrates a slope correction result of handwriting in an electronic device (e.g., the electronic device 101 in FIG. 1) according to certain embodiments, FIG. 23D illustrates a slope correction result of handwriting in an electronic device (e.g., the electronic device 101 in FIG. 1) according to certain embodiments, FIG. 24A illustrates a slope correction result of handwriting in an electronic device (e.g., the electronic device 101 in FIG. 1) according to certain embodiments, FIG. 24B illustrates a slope correction result of handwriting in an electronic device (e.g., the electronic device 101 in FIG. 1) according to certain embodiments, FIG. 24C illustrates a slope correction result of handwriting in an electronic device (e.g., the electronic device 101 in FIG. 1) according to certain embodiments, and FIG. 24D illustrates a slope correction result of handwriting in an electronic device (e.g., the electronic device 101 in FIG. 1) according to certain embodiments.

Referring to FIGS. 18A to 24D, it can be seen that the overall stroke and the placement of characters of handwriting of FIGS. 18D, 19D, 20D, 21D, 22D, 23D, and 24D corrected according to certain embodiments by extracting a corpus line key point and a base line key point as shown in handwriting of FIGS. 18B, 19B, 20B, 21B, 22B, 23B, and 24B, extracting feature values, and performing neural network calculation are more harmonious and natural and have excellent aesthetic impression as compared to handwriting of FIGS. 18C, 19C, 20C, 21C, 22C, 23C, and 24C obtained by correcting handwriting slopes of original input handwriting of FIGS. 18A, 19A, 20A, 21A, 22A, 23A, and 24A according to the another method.

Referring to FIGS. 18A to 18D, it can be seen that handwriting of FIG. 18C obtained by correcting the handwriting slope of original input handwriting of FIG. 18A according to the other method has two front characters placed relatively evenly while having the last character considerably out of balance. In contrast, it can be seen that handwriting of FIG. 18D corrected by extracting corpus line key points and base line key points as shown in handwriting of FIG. 18B, extracting feature values, and performing neural network calculation according to certain embodiments has all three characters balanced and evenly placed.

Referring to FIGS. 19A to 19D, it can be seen that handwriting of FIG. 19C obtained by correcting the handwriting slope of original input handwriting of FIG. 19A according to the other method has characters arranged along the base line and thus looking looks as if the overall center of balance of the characters is broken. In contrast, it can be seen that handwriting of FIG. 19D corrected by extracting corpus line key points and base line key points as shown in handwriting of FIG. 19B, extracting feature values, and performing neural network calculation according to certain embodiments has characters that are balanced overall and placed stably, rather than being arranged by simply mechanical alignment.

Referring to FIGS. 20A to 20D, it can be seen that handwriting of FIG. 20C obtained by correcting the handwriting slope of original input handwriting of FIG. 20A according to the other method has characters that appear to rise up as going to the rear part and are generally out of balance. In contrast, it can be seen that handwriting of FIG. 20D corrected by extracting corpus line key points and base line key points as shown in handwriting of FIG. 20B, extracting feature values, and performing neural network calculation according to certain embodiments has characters that are placed stably while the centers of front characters and rear characters are well-balanced.

Referring to FIGS. 21A to 21D, it can be seen that handwriting of FIG. 21C obtained by correcting the handwriting slope of original input handwriting of FIG. 21C according to the other method has two front characters placed relatively evenly while having the last character considerably out of balance. In contrast, it can be seen that handwriting of FIG. 21D corrected by extracting corpus line key points and base line key points as shown in handwriting of FIG. 21B, extracting feature values, and performing neural network calculation according to certain embodiments has all three characters balanced and evenly placed.

Referring to FIGS. 22A to 24D, it can be seen that handwritings of FIGS. 22C, 23C, and 24C obtained by correcting the handwriting slope of original input handwriting of FIGS. 22A, 23A, and 24A according to the other method has characters looking out of balance in the overall center of gravity as the characters are arranged along the base line. In contrast, it can be seen that handwriting of FIGS. 22D, 23D, and 24D corrected according to certain embodiments by extracting corpus line key points and base line key points as shown in handwriting of 22B, 23B, and 24B, extracting feature values, and performing neural network calculation has characters balanced overall and stably placed rather than being aligned simply and mechanically.

What is claimed is:

1. A electronic device, comprising:
   a processor; and
   a memory operatively connected to the processor,
   wherein the memory stores instructions that are executable to cause the processor to:
   receive an input of handwritten text including characters;
   set corpus line key points indicating substantial-top positions of the characters included in the handwritten text, and set base line key points indicating substantial bottom positions of the characters included in the handwritten text;
   calculate at least a first feature value based on at least one corpus line key point from among the corpus line key points, and a second feature value based on at least one extracted base line key point from among the base line key points, respectively;
   input the calculated first feature value into a first neural network to cause the first neural network to generate a first result value;
   input the calculated second feature value into a second neural network to cause the second neural network to generate a second result value; and
   input the first result value and the second result value into a fully connected neural network to generate a third result value.

2. The electronic device of claim 1, wherein the first feature value is calculated using a first slope value of a slope drawn between one key point of the corpus line key points and another key point of the corpus line key points, and
   wherein the second feature value is calculated using a second slope value of a slope drawn between one key point of the base line key points and a second key point of the base line key points.

3. The electronic device of claim 1, wherein the first neural network includes two or more neural sub-networks by which the first result value is processed, and wherein the second neural network includes another two or more neural sub-networks by which the second result value is processed.

4. The electronic device of claim 1, wherein the fully connected neural network includes two fully connected neural sub-networks by which the third result value is processed.

5. The electronic device of claim 1, wherein the instructions cause the processor to:
   sequentially input a plurality of calculated first feature values for the characters of the handwritten text into the first neural network, according to an order in which the characters were input; and
   sequentially input a plurality of calculated second feature values for the characters of the handwritten text into the second neural network according to the order in which the characters were input.

6. The electronic device of claim 1, wherein the instructions are executable by the processor to cause the electronic device to:
   analyze the characters included in the handwritten text to identify corresponding encoded character codes; and
   set at least two initial reference points for each character, the at least two initial reference points defining top and bottom limits of the characters to set an effective area for each of the characters,
   wherein the corpus line key points and the base line key points are respectively set according to: a horizontal corpus line intersecting a first of the at least two initial reference points, a horizontal base line intersecting a second of the at least two initial reference points, the effective area within each of the characters, and the identified corresponding encoded characters.

7. The electronic device of claim 6, wherein the instructions are executable by the processor to cause the electronic device to:
divide the effective area within the characters into two or more areas using a plurality of horizontal lines, based on the encoded character codes,
wherein positions of the corpus line and the base line are based on the character being placed into the two or more areas.

8. The electronic device of claim 6, wherein the instructions are executable by the processor to cause the electronic device to:
detect a reliability value for each of the characters included in the handwritten text, based on respective effective areas of each of the characters,
wherein the corpus line key points and base line key points are set for a first character when the reliability value of the first character is equal to or greater than a predetermined reliability threshold, and
wherein a second character is excluded from the setting of the corpus line key points and base line key points when the reliability value of the second character is less than the predetermined reliability threshold.

9. The electronic device of claim 1, further comprising a touch screen display operatively connected to the processor, wherein the instructions are executable by the processor to cause the electronic device to:
alter the handwritten text according to the third result value, and display the altered handwritten text on the display.

10. The electronic device of claim 1, further comprising a communication circuit operatively connected to the processor, wherein inputting the first and second feature values into the fully connected neural network includes transmitting the first and second feature values to an external electronic device through the communication circuit, and
wherein the third result value generated by the fully connected neural network is received as a transmission from the external electronic device.

11. A method of an electronic device, the method comprising:
receiving, using input circuitry, an input of handwritten text including characters;
setting, using a processor, corpus line key points indicating substantial-top positions of the characters included in the handwritten text, and setting base line key points indicating substantial bottom positions of the characters included in the handwritten text;
calculating, using the processor, at least a first feature value based on at least one corpus line key point from among the corpus line key points, and a second feature value based on at least one extracted base line key point from among the base line key points, respectively;
inputting, using the processor, the calculated first feature value into a first neural network to cause the first neural network to generate a first result value;
inputting, using the processor, the calculated second feature value into a second neural network to cause the second neural network to generate a second result value; and
inputting, using the processor, the first result value and the second result value into a fully connected neural network to generate a third result value.

12. The method of claim 11, wherein the first feature value is calculated using a first slope value of a slope drawn between one key point of the corpus line key points and another key point of the corpus line key points, and
wherein the second feature value is calculated using a second slope value of a slope drawn between one key point of the base line key points and a second key point of the base line key points.

13. The method of claim 11, wherein the first neural network includes two or more neural sub-networks by which the first result value is processed, and wherein the second neural network includes another two or more neural sub-networks by which the second result value is processed.

14. The method of claim 11, wherein the fully connected neural network includes two fully connected neural sub-networks by which the third result value is processed.

15. The method of claim 11, further comprising:
sequentially inputting a plurality of calculated first feature values for the characters of the handwritten text into the first neural network, according to an order in which the characters were input; and
sequentially inputting a plurality of calculated second feature values for the characters of the handwritten text into the second neural network according to the order in which the characters were input.

16. The method of claim 11, further comprising:
analyzing the characters included in the handwritten text to identify corresponding encoded character codes; and
setting at least two initial reference points for each character, the at least two initial reference points defining top and bottom limits of the characters to set an effective area for each of the characters,
wherein the corpus line key points and the base line key points are respectively set according to: a horizontal corpus line intersecting a first of the at least two initial reference points, a horizontal base line intersecting a second of the at least two initial reference points, the effective area within each of the characters, and the identified corresponding encoded characters.

17. The method of claim 16, further comprising:
dividing the effective area within the characters into two or more areas using a plurality of horizontal lines, based on the encoded character codes,
wherein positions of the corpus line and the base line are based on the character being placed into the two or more areas.

18. The method of claim 16, further comprising:
detecting a reliability value for each of the characters included in the handwritten text, based on respective effective areas of each of the characters,
wherein the corpus line key points and base line key points are set for a first character when the reliability value of the first character is equal to or greater than a predetermined reliability threshold, and
wherein a second character is excluded from the setting of the corpus line key points and base line key points when the reliability value of the second character is less than the predetermined reliability threshold.

19. The method of claim 11, further comprising:
altering the handwritten text according to the third result value, and display the altered handwritten text on the display.

20. An electronic device comprising:
a display;

a communication circuit;
a processor operatively connected to the display and the communication circuit; and
a memory operatively connected to the processor,
wherein the memory stores instructions that are executable by the processor to cause the electronic device to:
receive an input of handwritten text including characters;
set corpus line key points indicating a substantial-top positions of the characters included in the handwritten text and base line key points indicating a substantial bottom positions of the characters;
calculate at least a first feature value based on at least one corpus line key point from among the corpus line key points, and a second feature value based on at least one extracted base line key point from among the base line key points, respectively;
transmit the at least one first feature value and the at least one second feature value to a server through the communication circuit; and
receive, from the server, a third result value generated by processing of the at least one first feature value and the at least one second feature value by a fully connected neural network.

* * * * *